United States Patent
Young

(10) Patent No.: US 6,429,903 B1
(45) Date of Patent: *Aug. 6, 2002

(54) VIDEO ADAPTER FOR SUPPORTING AT LEAST ONE TELEVISION MONITOR

(75) Inventor: Thomas D. Young, Grayson, GA (US)

(73) Assignee: Colorgraphic Communications Corporation, Atlanta, GA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/618,618

(22) Filed: Jul. 18, 2000

Related U.S. Application Data

(63) Continuation-in-part of application No. 09/479,129, filed on Jan. 7, 2000, now Pat. No. 6,100,936, which is a continuation of application No. 08/922,614, filed on Sep. 3, 1997, now Pat. No. 6,028,643.

(51) Int. Cl.[7] .......................... H04N 7/00; H04N 5/445
(52) U.S. Cl. ................... 348/552; 348/569; 348/553
(58) Field of Search ................. 348/552, 553, 348/555, 563, 569; H04N 5/445, 7/00

(56) References Cited

U.S. PATENT DOCUMENTS

| | | |
|---|---|---|
| 4,680,629 A | 7/1987 | Fukushima et al. |
| 4,746,983 A | 5/1988 | Hakamada |
| 5,045,946 A | 9/1991 | Yu |
| 5,140,425 A | 8/1992 | Yamaguchi et al. |

(List continued on next page.)

FOREIGN PATENT DOCUMENTS

| | | |
|---|---|---|
| EP | 0 553 549 A1 | 8/1993 |
| EP | 0 574 748 A2 | 12/1993 |
| EP | 0 579 402 A1 | 1/1994 |
| WO | WO 93/21574 | 10/1993 |
| WO | WO 97/04382 | 2/1997 |
| WO | 99/12091 | 3/1999 |
| WO | WO 99/12091 | 3/1999 |

OTHER PUBLICATIONS

Annex to Form PCT/ISA/206—Communication Relating to the Results of the Partial International Search dated Jan. 20, 1999.

International Search Report in related PCT/US98/18149 dated May 27, 1999.

(List continued on next page.)

Primary Examiner—Sherrie Hsia
(74) Attorney, Agent, or Firm—Kilpatrick Stockton LLP

(57) ABSTRACT

Video adapter hardware and software permitting the display of computer information and television signals across several display devices. The video adapter hardware includes at least one television programming input and a multiplexer for feeding television programming to multiple television monitors. An alternative embodiment is adapted to feed at least one computer monitor and at least one television monitors, with or without also receiving computer generated input and combining the computer generated input with television programming for display on television monitors and/or computer monitors. Such adapters are useful for supporting video walls and other applications where it is desired to leverage the lower cost of television monitors as compared to computer monitors.

21 Claims, 28 Drawing Sheets

U.S. PATENT DOCUMENTS

| | | |
|---|---|---|
| 5,285,284 A | 2/1994 | Takashima et al. |
| 5,434,624 A | 7/1995 | Ishimura |
| 5,438,372 A | 8/1995 | Tsumori et al. |
| 5,448,315 A | 9/1995 | Soohoo |
| 5,475,442 A | 12/1995 | Matsushita et al. |
| 5,502,808 A | 3/1996 | Goddard et al. |
| 5,504,535 A | 4/1996 | Abe |
| 5,557,342 A | 9/1996 | Eto et al. |
| 5,592,234 A | 1/1997 | Gardner et al. |
| 5,594,859 A | 1/1997 | Palmer et al. |
| 5,606,656 A | 2/1997 | Yamaguchi |
| 5,610,663 A | 3/1997 | Nan et al. |
| 5,615,338 A | 3/1997 | Poole et al. |
| 6,028,643 A | 2/2000 | Jordan et al. |
| 6,100,936 A | 8/2000 | Jordan et al. |

OTHER PUBLICATIONS

XLR8 by Interex Heightens Video Graphics Speed and Performance with the Introduction of its Video Scream Line (XLR8 Press Release), Jan. 7, 1997 (available at http://www.xlr8.com/News/Press/1997/970107–Video.html).

Database WPI, Section PQ, Week 199830, Derwent Publications Ltd., London, GB; Class P85, AN 1998–337862, XP002189029 & JP 10 123995 A (Rohm Co. Ltd) May 15, 1998 Abstract.

Patent Abstracts of Japan, vol. 1998, No. 10, Aug. 31, 1998 & JP 10 123995 A (Rohm Co. Ltd), May 15, 1998, Abstract.

International Search Report in related PCT/US01/21682 dated Feb. 13, 2002.

though the rendering process is very complex. The present invention does not use video adapters in the traditional sense (but no pun); the term "video" is used throughout herein in keeping with general usage, even though the present invention departs from any prior art.

VIDEO ADAPTER FOR SUPPORTING AT LEAST ONE TELEVISION MONITOR

This is a continuation in part of U.S. Ser. No. 09/479,129 filed Jan. 7, 2000, U.S. Pat. No. 6,100,936, which is in turn a continuation of U.S. Ser. No. 08/922,614 filed Sep. 3, 1997, now U.S. Pat. No. 6,028,643. These documents are incorporated herein by this reference.

BACKGROUND OF THE INVENTION

1. Field of the Invention

The present invention is directed to video adapters with or without one or more television tuners, which adapters are capable of supporting multiple television type monitors, and software for controlling the same. These documents are incorporated herein by this reference. The present invention is directed to video adapters with or without one or more television tuners, which adapters are capable of supporting multiple television type monitors, and software for controlling the same.

2. Background

Video adapters (or "video cards") convert computer data to video signals for output to a monitor or similar output device. A typical Video Graphics Array ("VGA") card has its own memory and digital-to-analog converter ("DAC"), but does not actually process data, which is performed by the computer's CPU, including writing and reading of text, as well as drawing simple graphics primitives such as pixels, lines and memory transfers for images.

Programs such as DOS-based word processors run in VGA text mode while graphics-based programs such as games run in graphics mode. The operating systems sold under the trademark Windows by Microsoft Corp. run in VGA graphics mode as default, meaning that every pixel that is displayed as a part of the background, a window, or a text character must be written using basic VGA calls. The low-level nature of the VGA command set dictates that numerous commands be required to do something as simple as moving or closing a window. Clearly, an enormous amount of data is required to move from the VGA card, along the bus, into the CPU, and on into the card's memory, and vice-versa.

Accelerated video cards, however, have their own processor (or "accelerator"). Thus, an accelerated card may perform many video operations with only minimal input from the CPU. Indeed, the accelerated video card can perform all of the operations usually performed by the CPU with a VGA card. This frees the bus and the CPU to execute other tasks, and speeds-up video operation. Unlike VGA mode, where every pixel must be moved to and from the card via the bus and CPU, the accelerated card can perform the same operations with instructions consisting of only a few bytes being transferred along the bus. This results in an enormous performance gain for most common graphics operations, including bitmap and pixmap transfers and painting, movement of sprites and icons, opening and closing of windows, etc.

The increased performance of accelerated cards has permitted the introduction of more advanced graphics features. For instance, certain advanced accelerated cards now feature television tuning capabilities. Television cards include a television tuner capable of receiving and tuning a video source from a cable or a video cassette recorder. The card then converts the incoming video source into a signal that may be displayed on a conventional computer monitor. Cards with television tuners typically have additional processing and memory requirements.

Currently, adapters or external devices (so-called "TV Out devices") are available which contain encoders or other circuitry to convert VGA video signals to composite or S-Video television signals. This allows computer screens of information to be viewed on a television monitor. Such devices thus leverage on the fact that a television set has a lower cost than a computer monitor.

Current users combine multiple single video adapters and multiple TV Out devices into a system in order to create a "video wall". A video wall is an array of television sets or monitors that can display a number of individual video programs, or one or more video programs, over an entire array of television monitors. Currently, a system formed of many single video adapters and many single TV Out devices requires complex cabling and large systems to support the video wall. Controlling the devices in order to determine what programming appears on what television monitor, as well as the manner in which such programming appears, presents another formidable set of issues.

SUMMARY OF THE INVENTION

The present invention provides devices, systems and processes for displaying programming, which can include one or more programs or groups of content originated on a computer, on multiple television monitors. Video adapter hardware of the preferred embodiment of the present invention includes at least one user interface or graphics accelerator. Each accelerator can be coupled to an independent memory unit and a shared memory unit. The adapter can communicate with the computer's main CPU such as via the internal bus or bus interface. A bus bridge can handle data flow and concurrency issues if needed. Thus, the accelerator or accelerators can coordinate with the computer, process information from the computer, and otherwise do the necessary to render information from the computer in suitable form and/or format, via current standards or via any future standards, for presentation or display.

Adapters according to the present invention also include at least one TV out functionality which may be of conventional design or as otherwise desired. This functionality accepts output from the accelerator or accelerators and processes such output for display on television monitors (as differentiated from, for example, computer monitors). The aim is to display computer originated or generated information on a television monitor in order to leverage the lower cost of television monitors and the many other advantages to be gained from displaying information or content on such monitors.

According to a first embodiment of the present invention, accelerator functionality may be combined with TV out functionality to feed video multiplexer functionality which in turn supports two or more television monitors. A variant of this embodiment supports four television monitors.

According to a second embodiment of the present invention, two or more accelerator functionalities may be combined with two or more TV out functionalities to support two or more television monitors. In a variant of this embodiment, the TV out functionalities feed video multiplexer functionality to support four television monitors.

Adapters according to the present invention offer a number of useful and desirable results. Consider, for example, supporting a video wall. Video walls usually require a large number of television monitors to display one program or multiple programs. Previously, such walls were supported by an array of graphics accelerator cards, each of which was connected to a TV out card, each of which TV out cards fed a monitor. This arrangement required multiple slots in a computer chassis, and it required complex wiring. Moreover, it was complex and difficult to control the array of cards in order to present the desired programming in the desired way on the desired monitors.

By contrast to this conventional approach, adapters according to the present invention each can contain the accelerator and TV out functionality to support multiple monitors. For example, adapters according to the present invention can feature 4 TV Out interfaces to support four television monitors. (They can also accept external television signals for display on one or multiple television monitors.) Four adapters each of which supports 4 monitors can occupy slots in a single computer to support an array of 4 by 4 (16) television monitors, thereby creating an impressive video wall. This represents considerable cost saving over previous methods of single video cards with single TV out cards, greatly reducing cabling and number of bus slots and cards needed in a computer. Not only is space saved in the computer and complex wiring issues avoided, but this arrangement according to the present invention allows the adapter cards to be controlled from one interface supported by the computer in order to control what programming goes on what TV monitor in the desired way.

According to a preferred embodiment of the present invention, a TV Out signal can be generated to accommodate composite, S-Video or any other desired standards, present or future. Any other desired signals can be supplied to connectors on the adapter to be coupled to one or more television monitors. Multiple output standards including NTSC-M, NTSC-44, PAL-B, PAL-G, PAL-H, PAL-I, PAL-M, PAL-N, PAL60, SECAM, and S-VHS can be supported. The TV out signals can be in addition to computer video output so that either or both television or computer monitors may be supported.

Each TV Out connection can have the same capability of its associate monitor. Therefore computer data or video decoder data from television tuners or outside signals can be displayed on the television. This provides the television sets with full function video wall capability allowing for display of one or multiple pieces of visual content or programming, whether computer or television tuner originated. Each piece of content or program can appear on an individual monitor or multiple monitors. Alternatively, multiple content can appear, some on individual monitors, some on multiple. The monitors can include television monitors, computer monitors, or a mixture of both, or any desired sort of monitor or viewing or rendering device or interface, whether cathode ray tube, liquid crystal display, or other.

Adapters according to the present invention can include one or more video inputs to feed one or more on-board television tuners which can accept external television signals from an outside source, such as a cable television company or a video cassette recorder. As an alternative, adapters of the present invention can accept television programming from external or other television tuners. As a further alternative, no information or programming from any television tuner need be accepted, processed or displayed; in this case, adapters according to the present invention feed monitors, including multiple television monitors, and optionally but not necessarily with the ability also to feed one or more computer monitors, with programming generated by computer rather than television tuning circuits.

Objects and advantages of the invention will be apparent in part in the description preceding and which follows together with the drawings, and in part will be apparent from the description or may be learned by practice of the invention.

DETAILED DESCRIPTION

Figure 1:
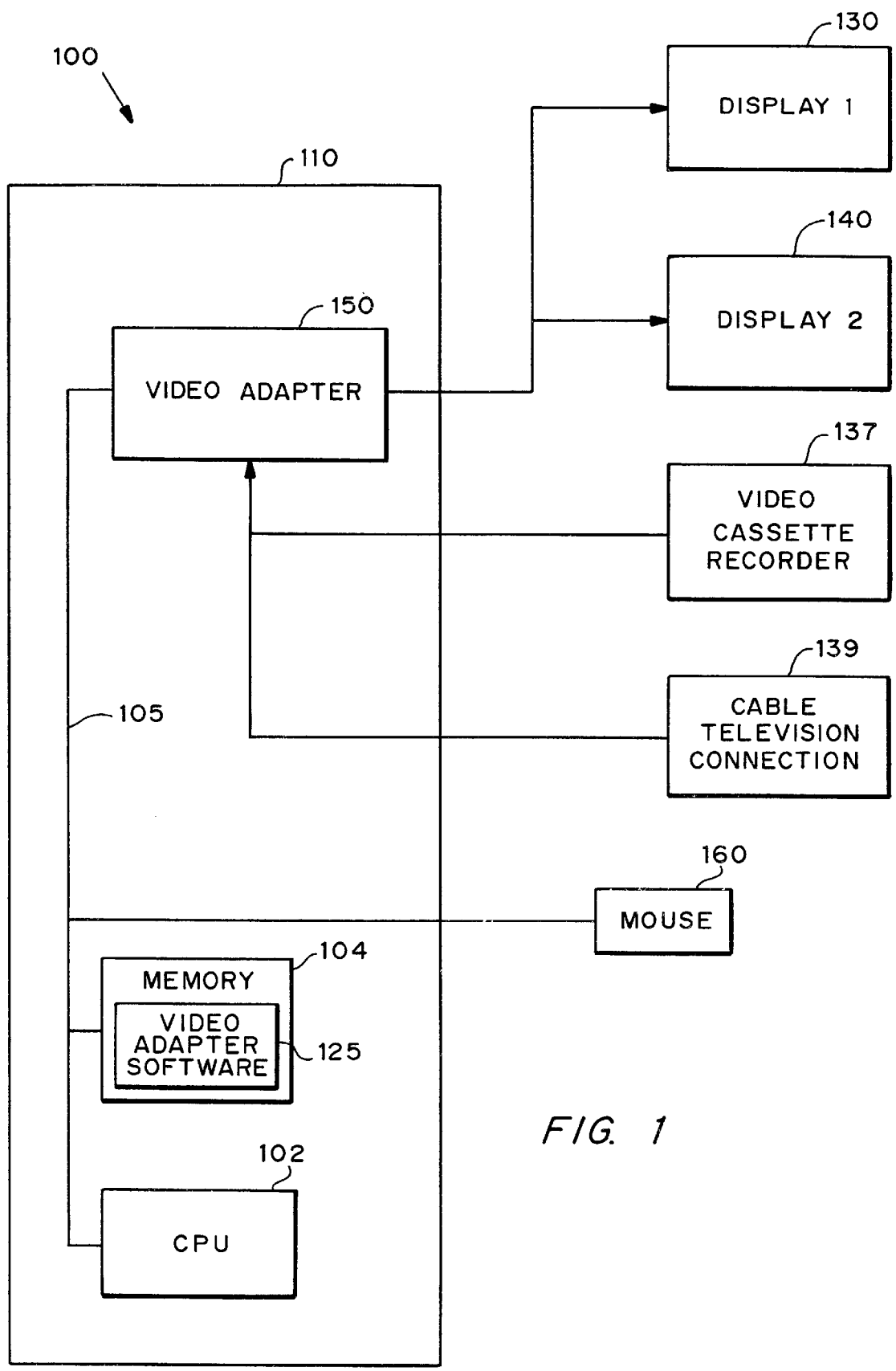
FIG. 1 is a functional block diagram of a computer system that includes a video adapter according to a preferred embodiment of the present invention.

FIG. 1 is a block diagram of a computer system 100 in accordance with a preferred embodiment of the present invention. Computer system 100 includes a computer 110. Computer 110 can include any or all of a CPU 102, a memory 104, a bus 105, a first display device 130 (e.g., a television monitor), a second display device 140 (e.g., another television monitor), an input device 160 (e.g., a mouse), and an adapter 150 coupled to the first display device 130 and the second display device 140 by electrical connections. Memory 104 can include computer programs, code or software 125 that support graphics processing, control functionality, and other things deemed necessary or desirable to make adapter 150 perform as desired. The operation of the software is discussed below. It will be understood by persons of ordinary skill in the art that computer system 100 may also include numerous elements not shown in the figure for the sake of clarity, such as disk drives, keyboards, display devices, network connections, additional memory, additional I/O elements, additional CPUs, etc. It can also omit one or more of the functionalities mentioned above.

Computer system 110 can also include an operating system (not shown), such as the Windows operating system. "Windows" is a registered trademark of Microsoft Corp. The present invention is not limited to any particular hardware, operating system, or type of computer system.

Figure 2:
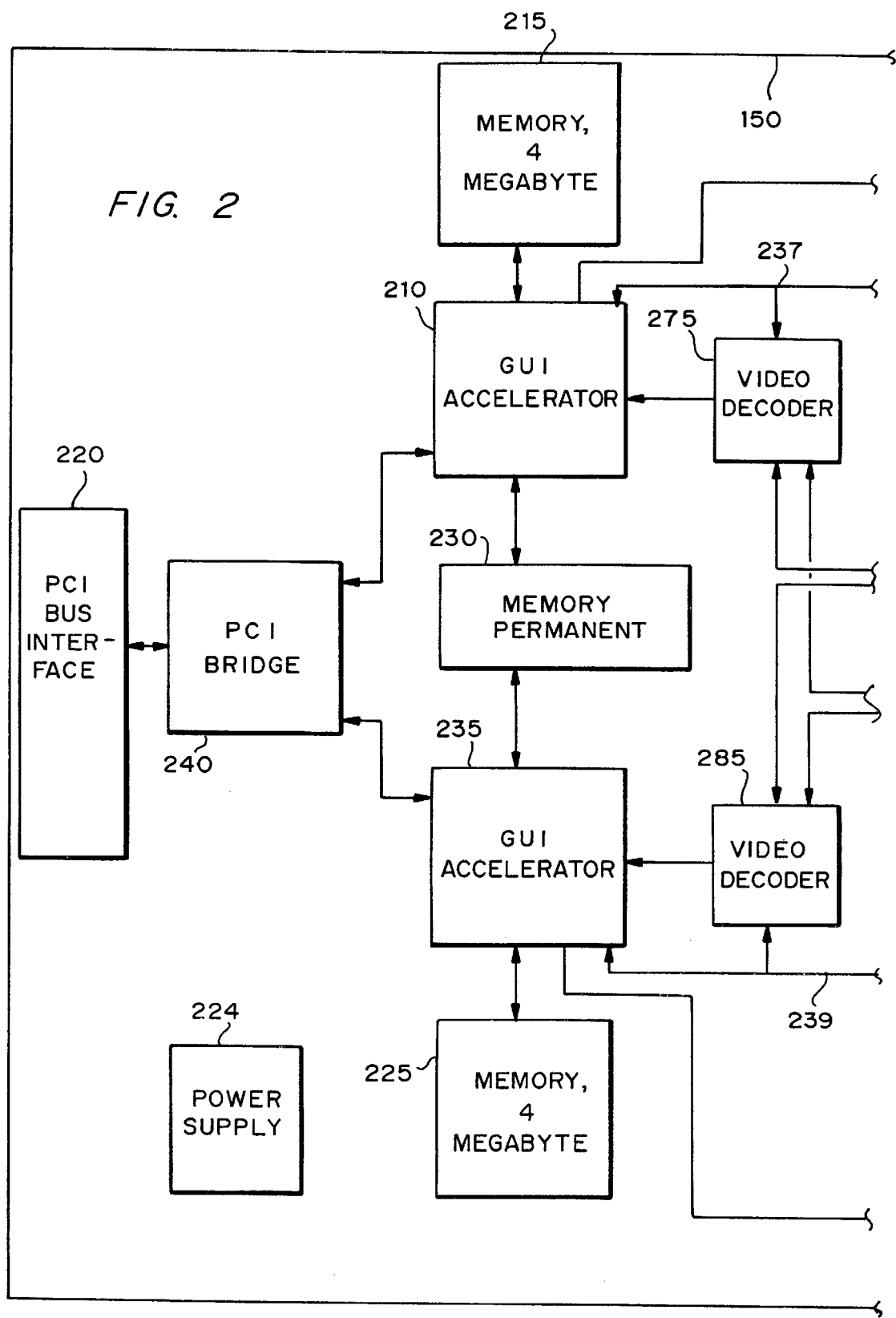
FIG. 2 is a functional block diagram of one embodiment of an adapter according to the present invention.
Figure 2A:
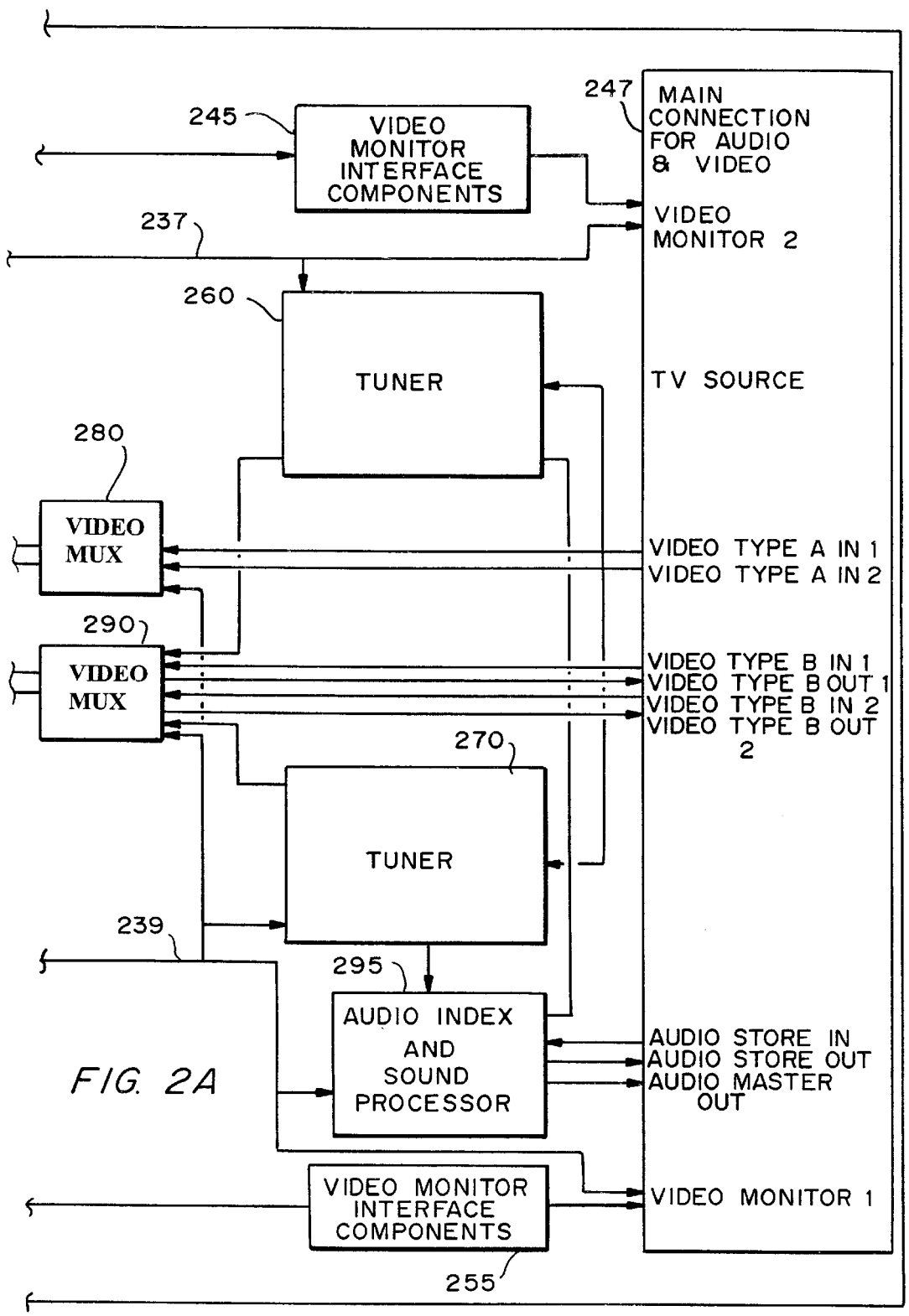
FIG. 2A is a functional block diagram of a second embodiment of an adapter according to the present invention.
Figure 2B:
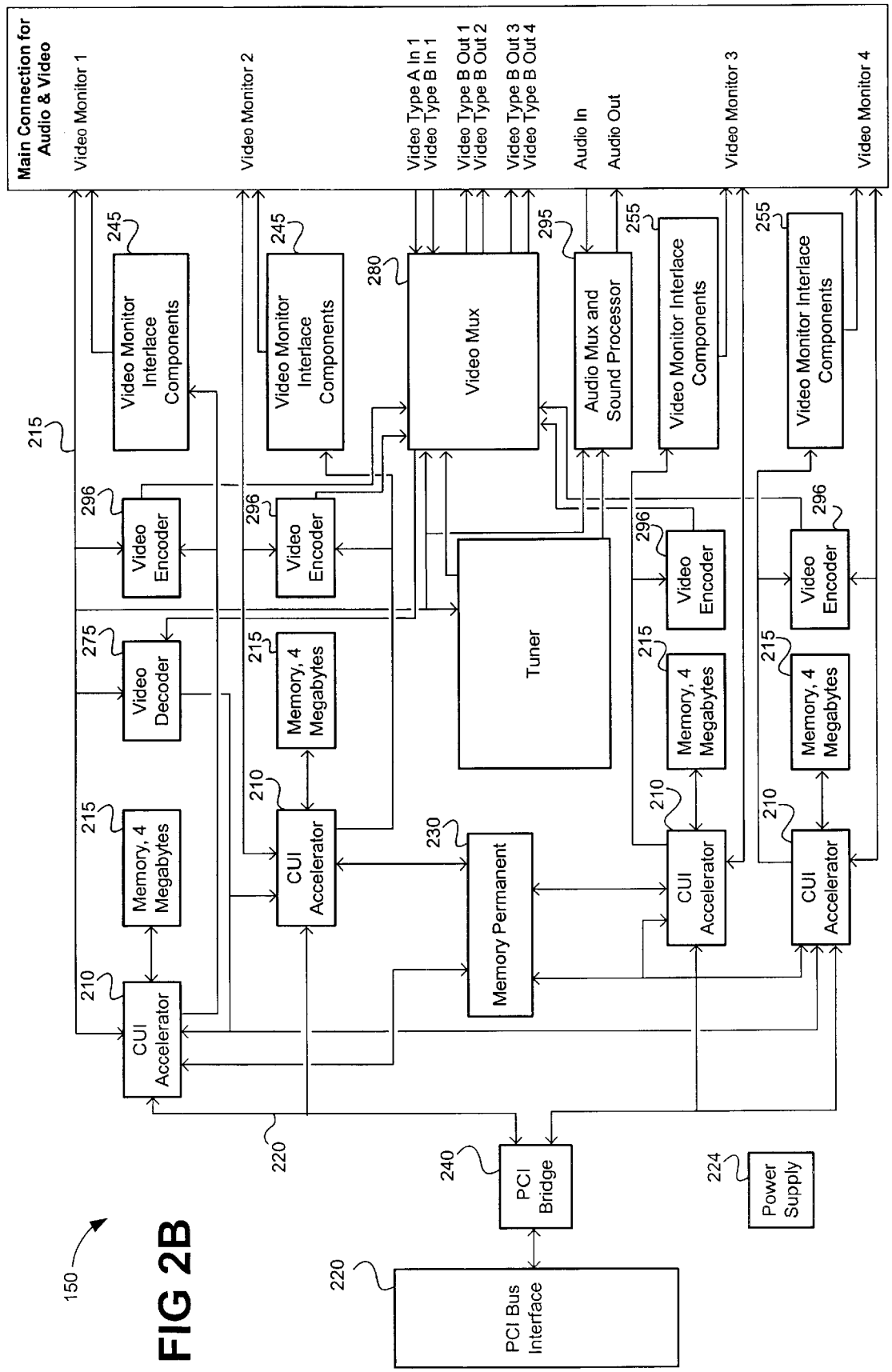
FIG. 2B is a functional block diagram of a third embodiment of an adapter according to the present invention.

FIG. 2B is a partial block diagram of another embodiment of an adapter 150 according to the present invention, which adapter supports four television monitors as well as four computer monitors. The adapter 150 can be implemented as a circuit board having a plurality of integrated circuits. The adapter 150 can interface to a computer in any desired manner; in the preferred embodiment, it includes a 32-bit PCI Version 2.1-compliant bus interface 220 that couples with a single PCI bus expansion slot (not shown) in the computer 110. Data flows between the computer 110 and the adapter 150 in this particular embodiment through the bus interface 220. It should be apparent to one of ordinary skill in the art, however, any other current or future bus standards, such as ISA or other versions of PCI may be used.

The adapter 150 processes data from the computer 110 in this particular embodiment via a PCI bridge 240 although any interface or connection between adapter 150 and computer 110 may be implemented or used as desired. Subject to that, this PCI bridge 240 bridges data from a PCI bus interface 220 to the four accelerators on this adapter. (Adapters according to the present invention may contain any number of accelerators; in an embodiment discussed below, for example, the adapter contains one accelerator to support multiple television monitors.)

The PCI bridge 240 in this particular adapter shown in FIG. 2 can include control logic, concurrency control, and buffering that permit an accelerator or accelerators to access the single PCI bus interface 220. This bridge 240 in this particular embodiment can implement delayed transactions for all PCI configurations, I/O, and memory-read commands, such that any desired number of transactions may be performed simultaneously in each direction. This bridge 240 can support multiple simultaneous posted write commands, with 88 or any number of bytes of buffering for each command. This PCI bridge 240 further provides concurrent primary and secondary bus operation, as well as enhanced address decoding to thereby isolate traffic in both directions.

The video adapter 150 of the embodiment shown in FIG. 2 could if desired include one or more television tuners, and/or it could accept signals from one or more external tuners. Each tuner could accept television signals from a cable television connection, a video cassette recorder, a television antenna, or other source. In the particular embodiment shown in FIG. 2B, one or more video decoders 275 can convert analog video signals from the video multiplexer 280 into a digital component stream for use by an accelerator functionality 210. The video decoders 275 can include full video acquisition capability, including text slicing for intercast, teletext, and closed-captioning capability. Any desired input formats, including NTSC-M, NTSC-44, PAL-B, PAL-G, PAL-H, PAL-I, PAL-M, PAL-N, PAL-60, SECAM, and S-VHS and other standards or formats, current or future, can be supported. Computer software may be used to control various video processing features via control busses 237, 239. Specifically, a user may control the hue, brightness, contrast, window cropping/scaling, horizontal and vertical resizing, and/or anti-aliasing features among others. The software is discussed in greater detail below.

In the preferred embodiment shown in FIG. 2B, the video encoders 296 of the video adapter 150 provide generation of the TV Out signals. The video encoders 296 are fed the display data from the GUI accelerators 210, at least in situations where computer generated programming is combined with television input. The display data can be collected from the three analog outputs of red, green, and blue signals, which can also go to the video monitor interface components 245. An alternate method of collecting the display data is to take digital data from the GUI accelerators 210. Both display data inputs to the video encoders 296 are shown on in FIG. 2B. The video encoders 296 can be controlled by the 12C serial control busses 237, 239. The software instructs the video encoders 296 to convert the incoming display data into numerous television signal formats. The television formats include NTSC-M, NTSC-44, PAL-B, PAL-G, PAL-H, PAL-I, PAL-M, PAL-N, PAL60, SECAM, and S-VHS. The converted television signals are then routed to the video multiplexer 280 so that the signal can be routed out connectors of the video adapter 150. Video connectors for composite television signals are RCA phono connectors and for S-Video are Mini DIN connectors. Any desired connector can be used.

The adapter 150 of the preferred embodiment shown in FIG. 2B includes four graphic user interface ("GUI") accelerators 210 although fewer or more could be used. Each accelerator 210 can be coupled to a memory unit 215. The memory units 215 can be synchronous graphic random access memory ("SGRAM") units, although other memory types may be used. The memory units 215 store decoded video data, graphic data from computer operations, character fonts, and other information required for operation of the adapter 150. The shared memory 230 serves as the BIOS for the accelerator card 150. Rather than using two separate BIOS chips for each accelerator, the memory can be shared between the accelerators 210.

The GUI accelerators 210 are preferably accelerators sold under the trademark CL-GD5480, by Cirrus Logic, Inc, although any graphic accelerator chip may be used. Each GUI accelerator 210 is a graphic visual media accelerator integrated circuit with additional graphic support logic. The GUI accelerators 210 support a synchronous dynamic random access memory ("SDRAM") interface, a digital camera interface, a PCI bus interface, a graphics controller, a BITBLT engine, a stream engine, a VGA graphics controller, and CRT controller functions. The GUI accelerators 210 combine decoded video data from the video decoders 275 with the computer graphics information stored in memory 215. Resultant data from the GUI accelerators 210 is output to computer monitors via video monitor interface components 245. Accelerators need not be in the loop if all that is desired is production of television monitor output from television format input, with no combination or addition of computer generated programming or graphics.

The video adapter 150 may further include an audio multiplexer/sound processor 295. The audio multiplexer 295 accepts audio inputs from each of the television tuners or other sound sources. Computer software may be used to control various audio processing features via control busses 237, 239. Specifically, a user may control the volume, balance, mute control, pseudostereo, spatial function, treble, and bass characteristics of the audio output through the video adapter software. Processed audio is output to an external to speaker system or amplification device.

The accelerator card 150 is powered by a power supply 224. The power supply 224 draws power from the computer's main power supply (not shown) via the PCI bus interface 220. The power drawn by the power supply is then converted to the proper voltages required to power each element of the accelerator card 150. Specifically, the PCI bridge 240, the video multiplexer 280, any tuners, and the remaining circuitry all require different voltages. The power supply converts the main voltage to a particular voltage for each card element.

Figure 2C:
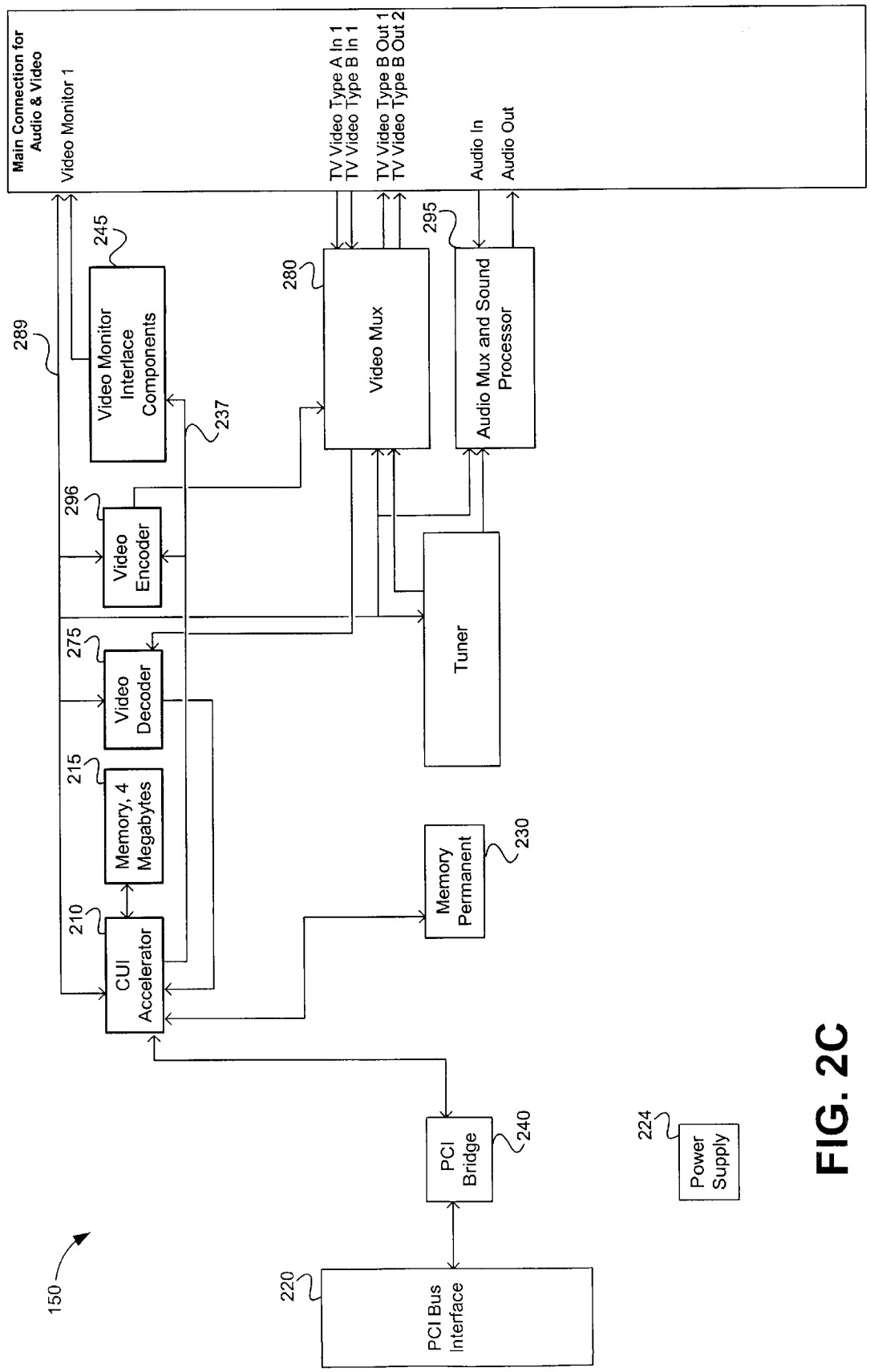
FIG. 2C is a functional block diagram of fourth embodiment of an adapter according to the present invention.

FIG. 2C shows a functional block diagram of another embodiment of the present invention. This embodiment is constructed and operates in some ways similarly to the embodiment shown in FIG. 2B, but it feature one accelerator 210, video encoder 296 and video monitor interface components set 245, to support one computer monitor and one or more television monitors. If there is no need to overlay or mix computer generated graphics with television programming, then the graphics accelerator 210 and related circuits could be omitted. Such a product could thus support multiple television monitors under computer control. The multiplexer 280 shown in FIG. 2C, like that shown in 2B, could support one or any number of television monitors as desired, based on one or multiple television programming inputs (with or without needing a tuner or tuners as shown in FIG. 2C).

Accordingly, systems and processes of the present invention make it possible using one card to support one or more television monitors as desired, based on one or more television programming inputs (with or without including or needing onboard tuning capacity) under computer control. One or more computer monitors may also be supported, and computer graphics can but need not be handled and displayed by such cards in combination with the television programming. One television program may be displayed across multiple television monitors, or on one television monitor or on part of one television monitor display. Multiple television programs can be apportioned for display across multiple television screens as desired, for instance one program per television monitor, one program on some television monitors and another television program on other television monitors, or however desired, is all under computer control as desired.

III. Video Adapter Software.

The following discussion relates to one version of computer control which may be used in connection with display of content on television monitors with or without also displaying content on computer monitors according to the present invention.

Figure 3:
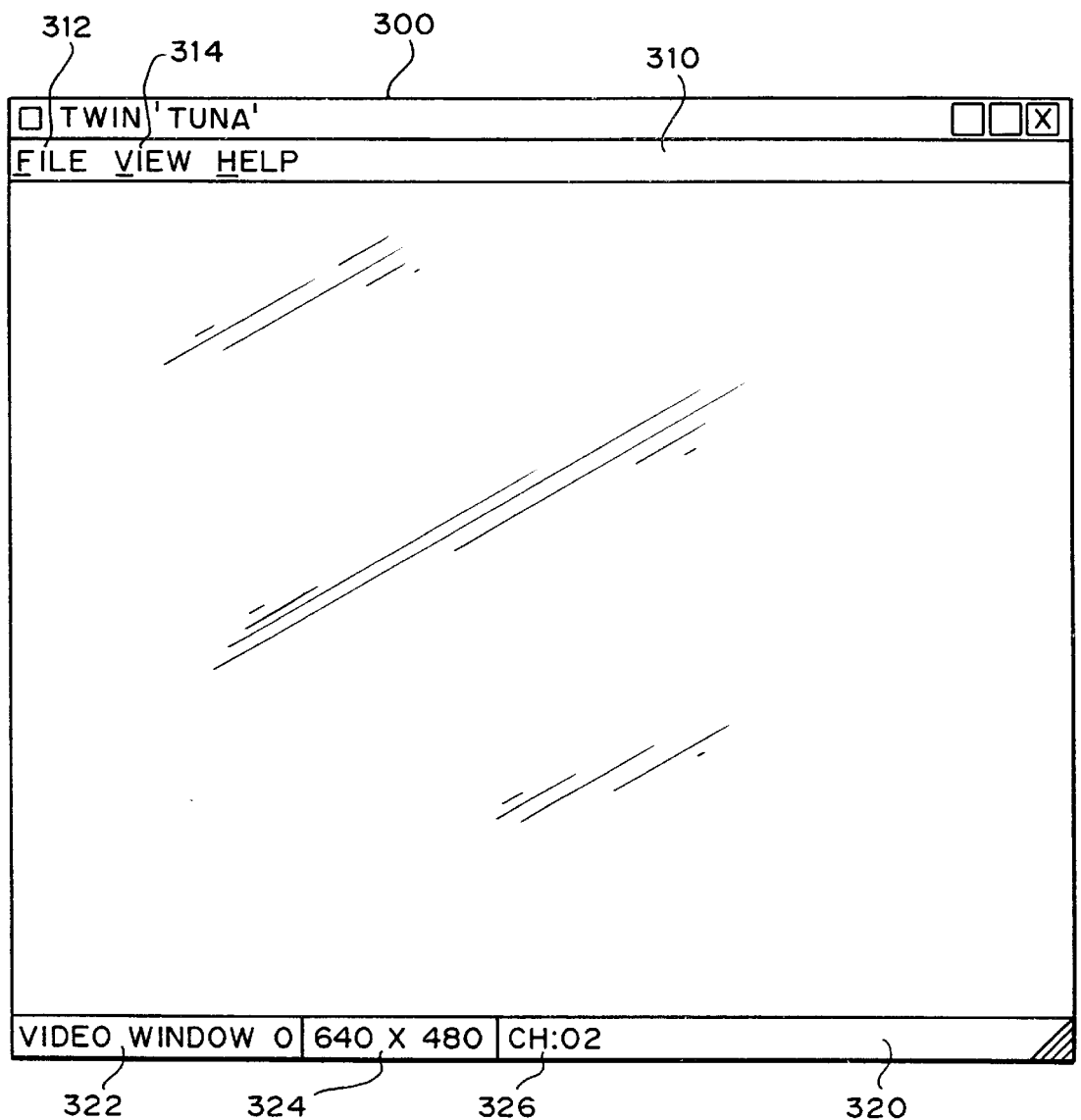
FIG. 3 shows an initial screen display supported by the embodiment of FIG. 1.

FIG. 3 shows an initial screen display 300 of the embodiment of FIG. 1. The screen display of FIG. 3 is the initial screen display shown when the video adapter software of the described embodiment is first executed in a Windows 95 environment. Screen display 300 includes a video area 302, a menu bar area 310, and a status bar area 320. Menu bar area 310 includes three menu items: a "File" menu item 312, a "View" menu item 314, and a "Help" menu item 316. Status bar area 320 includes three parts: a video window part 322 indicating a video window number, a resolution part 324 indicating a video resolution for the active video window, and a channel part 326 indicating a tuned channel within the active video window.

Figure 4:
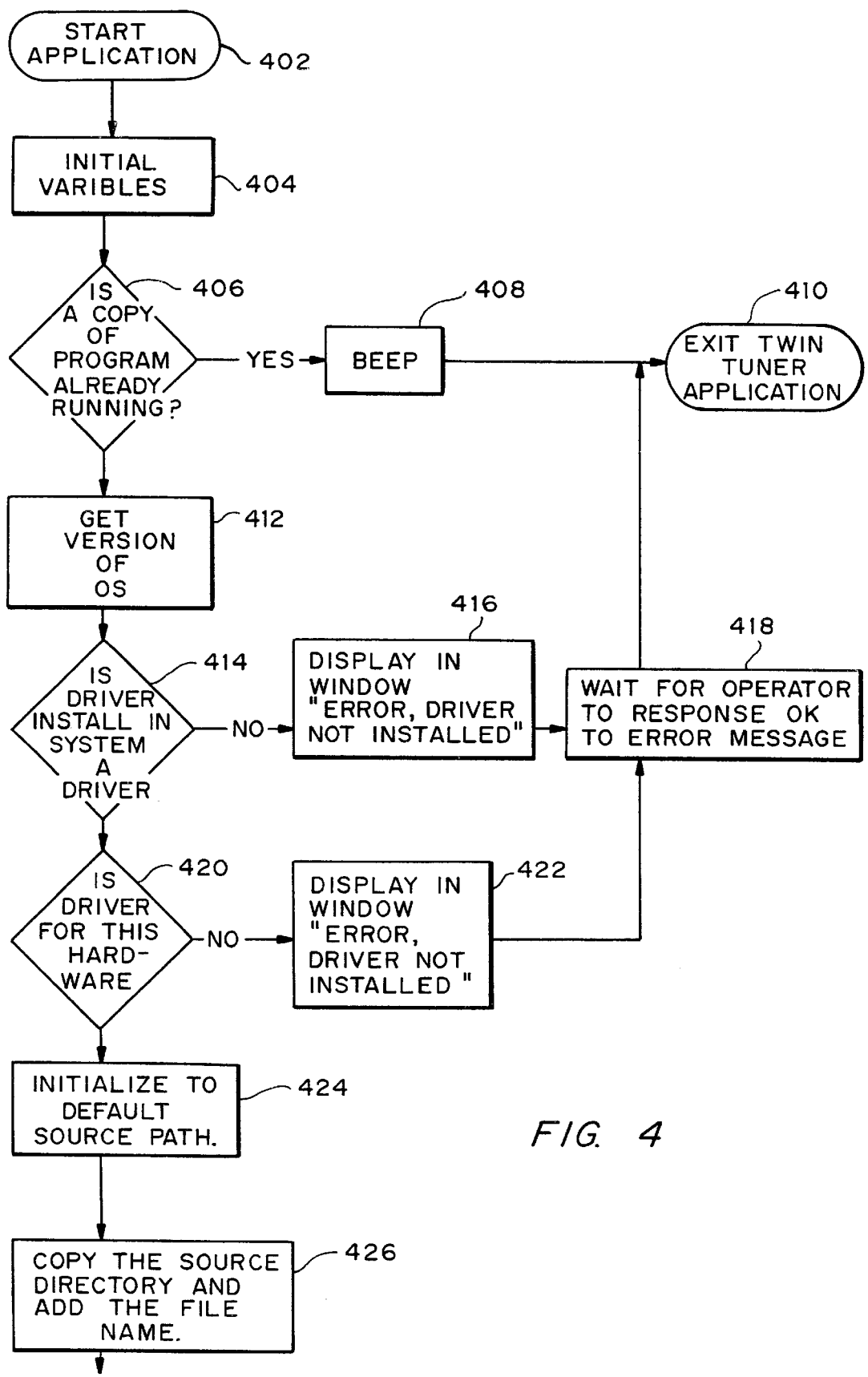
FIG. 4 is a flow chart illustrating steps performed during initialization of a preferred embodiment of video adapter software according to the present invention.

FIG. 4 is a flow chart illustrating steps performed during initialization of the video adapter software in Windows 95. (Hereinafter, the words "software" and "program" will be used interchangeably.) It will be understood by persons of ordinary skill in the art that the flow charts in this document generally represent steps performed by CPU 102 in accordance with instructions stored in memory 104. When the video adapter software is started, it first instantiates, in step 404, all variables associated with the software. In addition, when the software is first executed, the program searches the system for another running instance of the program. If another instance of the program is found, the new instance of the program must terminate. Accordingly, the software calls an operating system command to sound the internal computer bell at step 408. The new instance of the software exits the system at step 410.

In step 412, the software obtains the version number of the operating system. The software then determines, in steps 414 and 420, respectively, whether a generic driver and video-adapter-specific driver have been installed. If no generic driver is found, the program displays the message "Error: generic driver not installed" in the active window at step 416. The program then proceeds to wait for the user to issue an "OK" response to the error message. Similarly, if a video-adapter-specific driver is not found, the program displays the message: "Error: video adapter driver is not installed," in the active window at step 422. Program control continues at step 418. Following a response from the user, the software exits at step 410.

Once the appropriate device driver has been located, the software, in step 424, initializes to a default source path (disk drive location). The default source path is the path in which the software was originally installed. In step 426, the software copies the source directory and a default file name to a variable.

Figure 5:
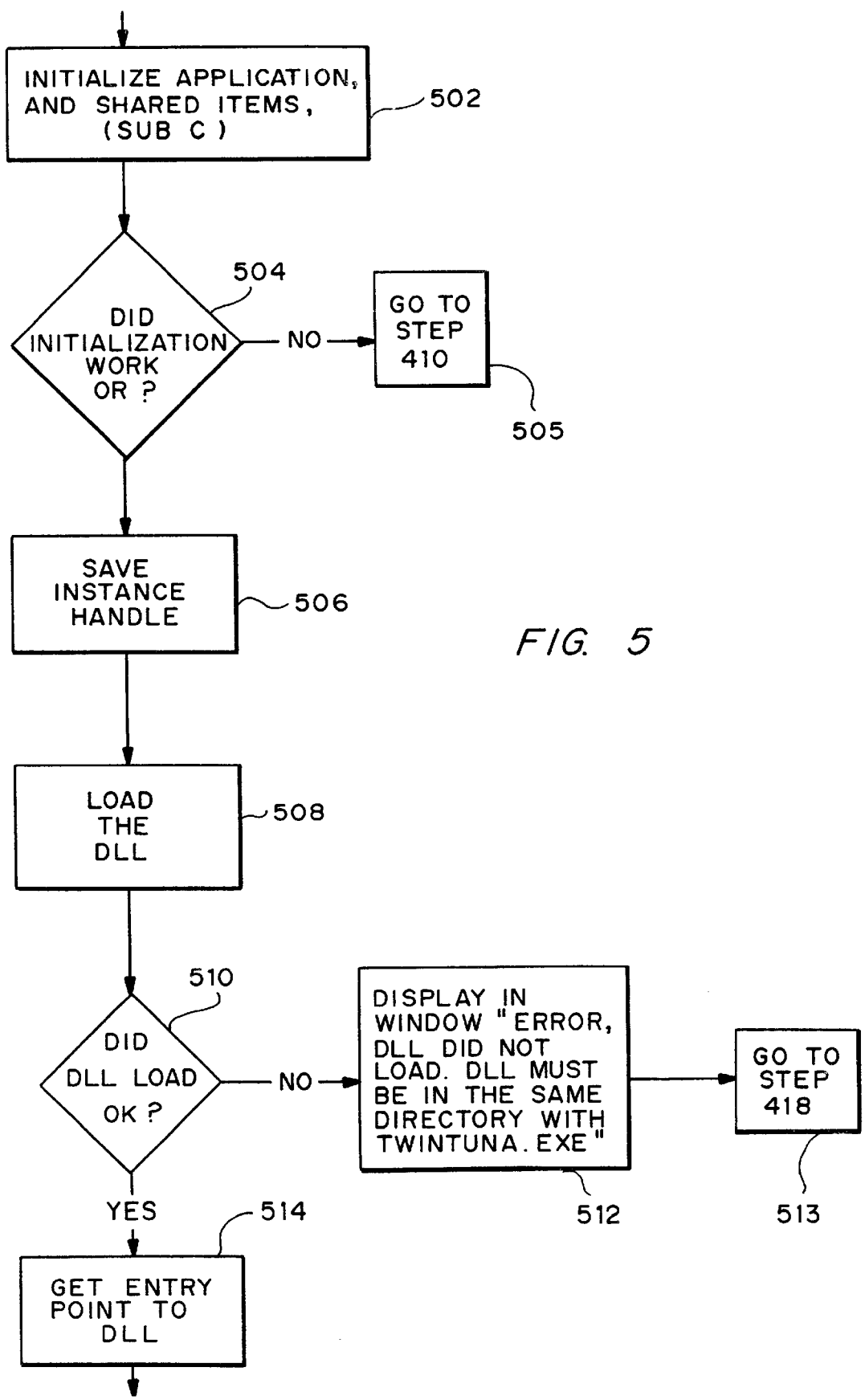
FIG. 5 is a flow chart further illustrating initialization of the video adapter software.
Figure 6:
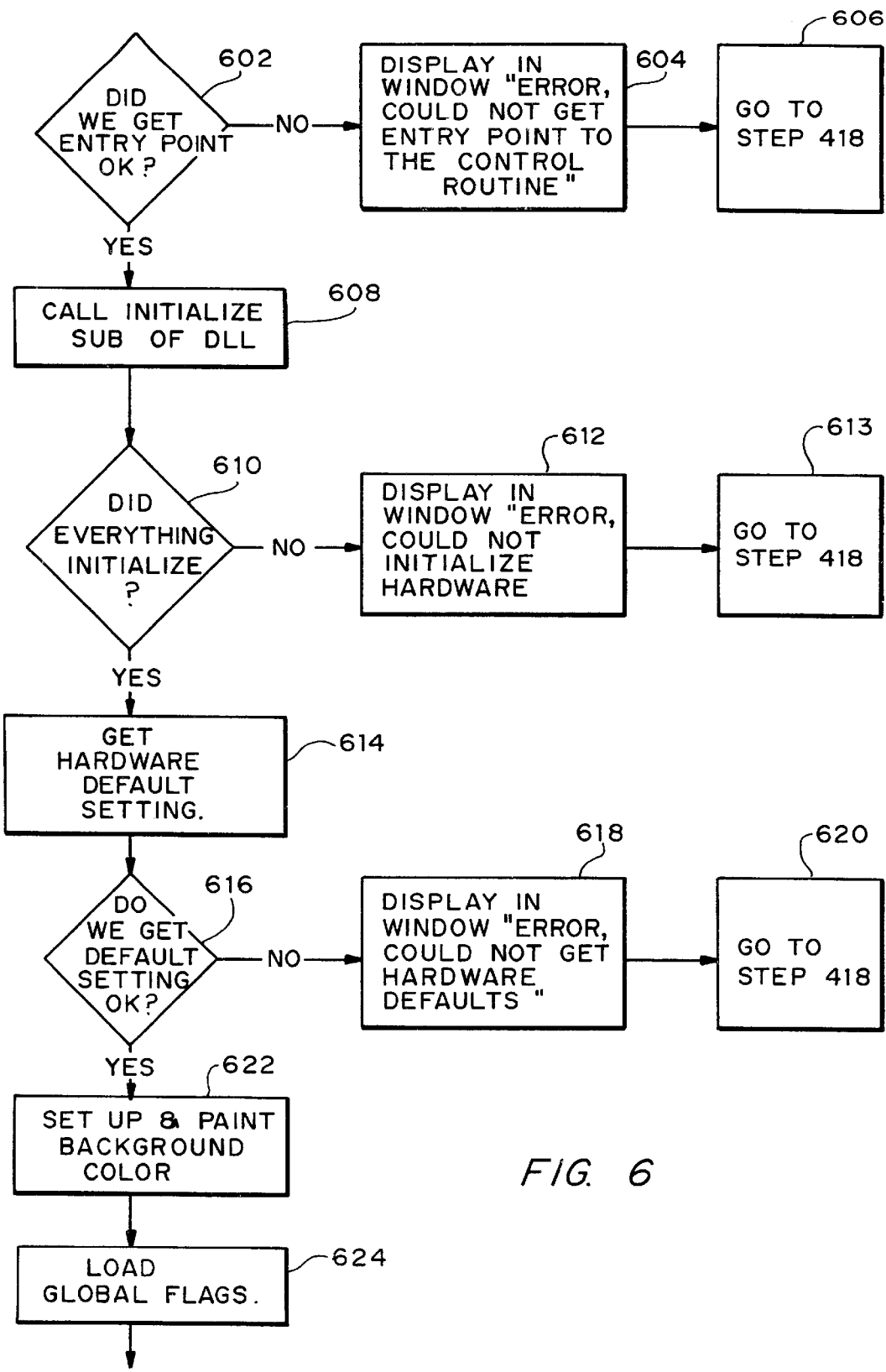
FIG. 6 is a flow chart further illustrating initialization of the video adapter software.
Figure 7:
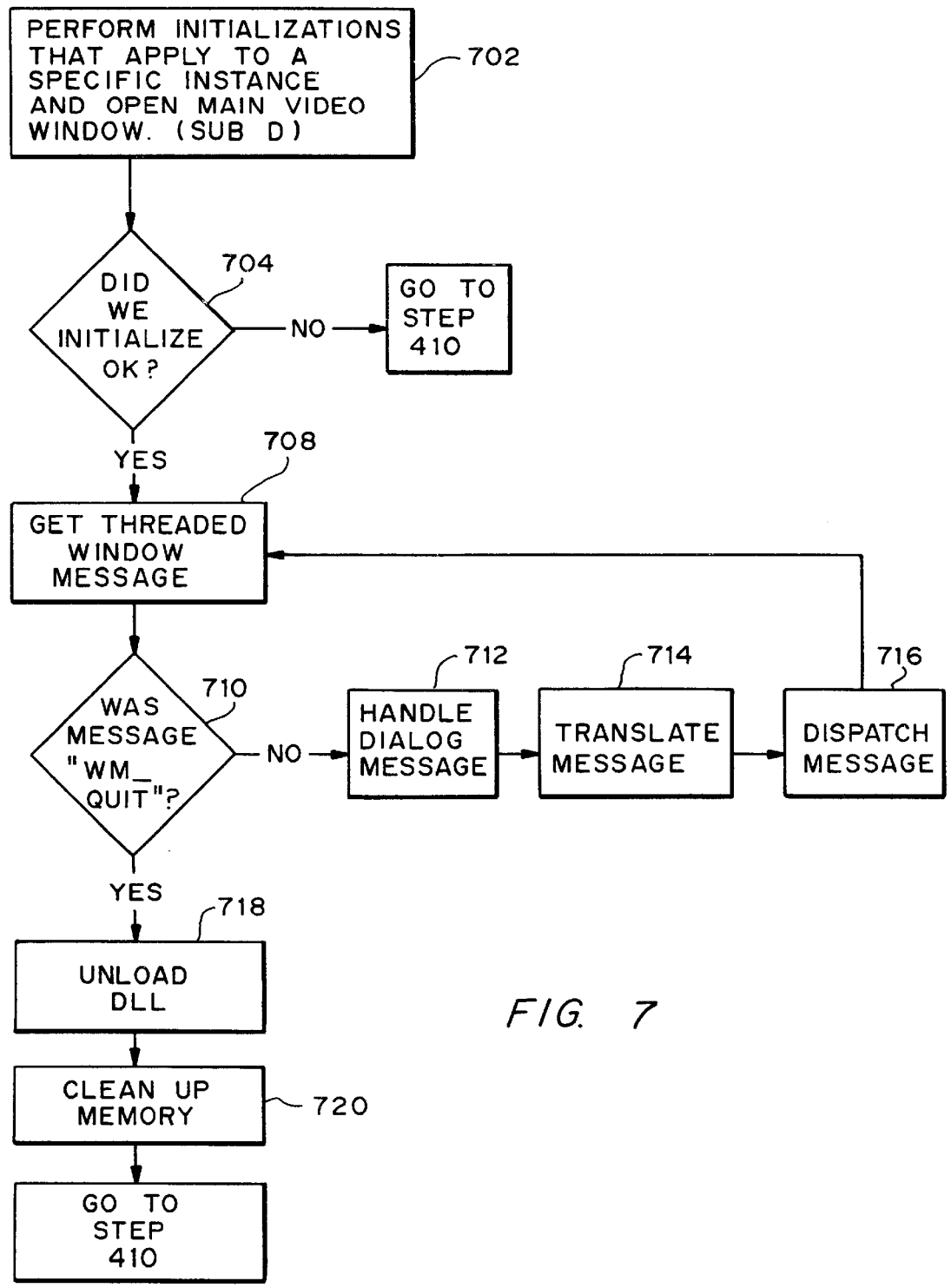
FIG. 7 is a flow chart further illustrating initialization of the video adapter software.

Program initialization continues in FIGS. 5–7. In step 502, the program goes to step 802, where an application instance and shared items are initialized by a subroutine (Subroutine C described below). If the initialization was performed without error, the program continues to step 506. Otherwise, the program goes to step 410 and terminates. In step 506, an instance handle provided by the operating system is saved in an instance handle variable. Next, the software loads an operating system dynamic link library (the "DLL") in step 508. The DLL is a library of low-level routines used to access the hardware. The primary function of the DLL is to determine the hardware present in the system and carry out the device control requests of an application. For example, the DLL turns on and off the video registers in the graphic accelerators, sets the video window size in the graphic accelerators, controls the sound process treble and bass, switches the video multiplexers to the correct source, sets the channel on the tuners, etc. The software, in step 510, checks to ensure that the DLL loads properly. If the DLL fails to load, the program displays the message: "Error: DLL did not load. DLL must be in the same directory with [XXX].exe" in the active window, where [XXX] is the name of the executable file containing the software described herein. The program then continues control at step 418. If the DLL loads properly, the software attempts to obtain the entry point for the DLL for later use in step 602. If the entry point is not obtained in step 602, the software displays the message: "Error: Could not get entry point to the control routine" in step 604 and goes to step 418 where the program eventually terminates.

Once the DLL entry point is obtained, program control continues at step 608, where the program calls an initialization subroutine of the DLL. If the DLL fails to initialize, the software, in step 612, displays the message: "Error: Could not initialize hardware" and goes to step 418. Following initialization, the software obtains the default settings for the video adapter 150 in step 614. In step 616, the software confirms the receipt of these setting. Failure to obtain the settings results in the display of the message: "Error: Could not get hardware defaults." The program would then continue at step 418. If the hardware defaults are obtained, the program creates and paints a background color for the active window in step 622. In step 624, the software loads all global flags that will be used by the operating system.

In step 702, the program goes to step 802, where the main video window is opened and instance initializations are performed by a subroutine (Subroutine D described below). If initialization is properly performed, processing continues at step 704. Otherwise, the program terminates. At step 708, the program enters a message loop to obtain threaded window messages from the operating system. If the message is "WM_QUIT," the message loop ends and program flow continues in step 718. For all other Windows messages, the program goes to step 712. The software first handles all dialog box messages. Following the processing of the dialog box message, the software translates any virtual key codes. generated by Windows 95 into character messages in step 714. Once the message has been read and translated, it is dispatched back to the operating system in step 716. Windows 95 then holds this message until it can be passed to the program's window function. When the software receives a "WM_QUIT" message in step 710, it unloads the DLL from memory. In step 720, the program cleans up all memory and resources and terminates.

Figure 8:
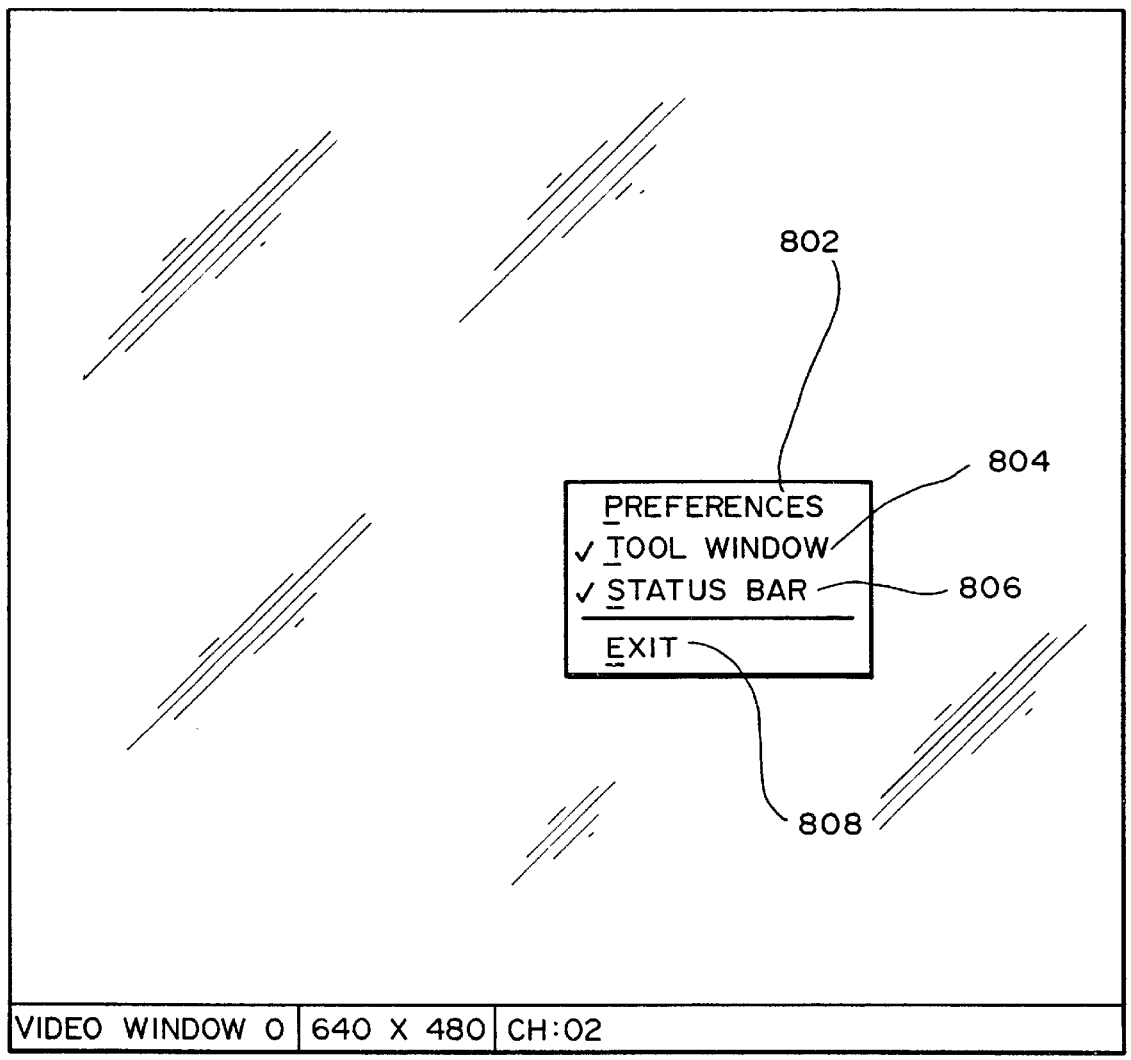
FIG. 8 is a screen illustrating a pop-up menu displayed when the user right-clicks in the video window of a display according to a preferred embodiment of the present invention.

FIG. 8 is a screen illustrating a pop-up menu created by subroutine C and displayed when the user right-clicks in the video window. The pop-up menu includes five menu items: a "Preferences" menu item 802, a "Tool Window" menu item 804, a "Status Bar" menu item 806, a blank line, and an "Exit" menu item 808. Each of these items is described in detail in the discussion of menu processing below.

Figure 9:
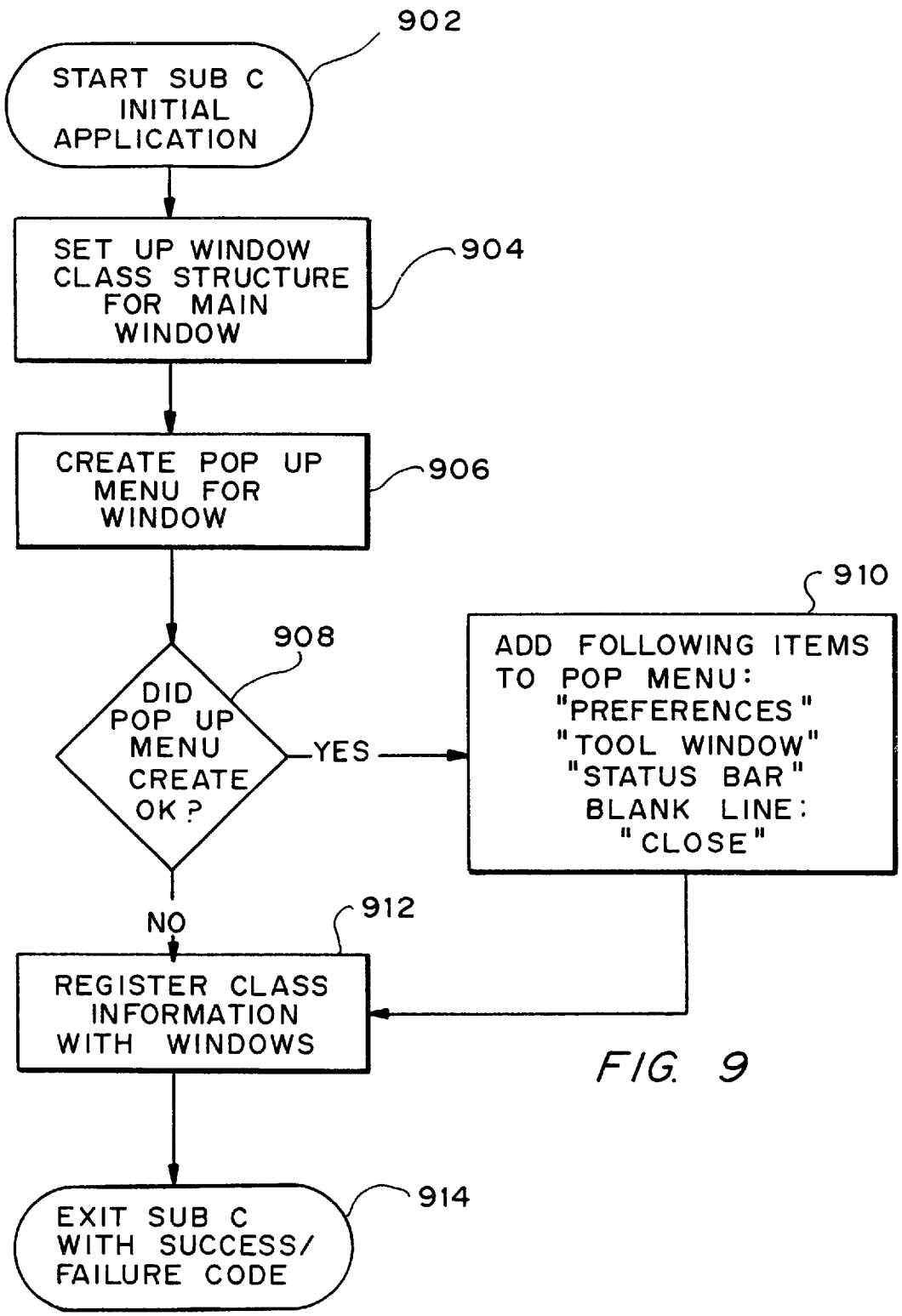
FIG. 9 is a flow chart describing the steps of a menu subroutine in a preferred embodiment of software according to the present invention.

FIG. 9 is a flow chart describing the steps of subroutine C, which is called from other points in the program. Subroutine C begins processing at step 902. In step 904, the routine defines a window class structure for the main window. The window class structure includes the default fields for the WNDCLASS structure. The instance handle obtained in step 506 is used to define the HINSTANCE field of the structure. In step 906, a pop-up menu is created for the defined window. The software in step 908 ensures that the pop-up menu was created properly. If the menu was properly created, the software creates the menu items. Once the menu items have been created, the window class is registered with the operating system in step 912. The software exits Subroutine C in step 914.

Figure 10:
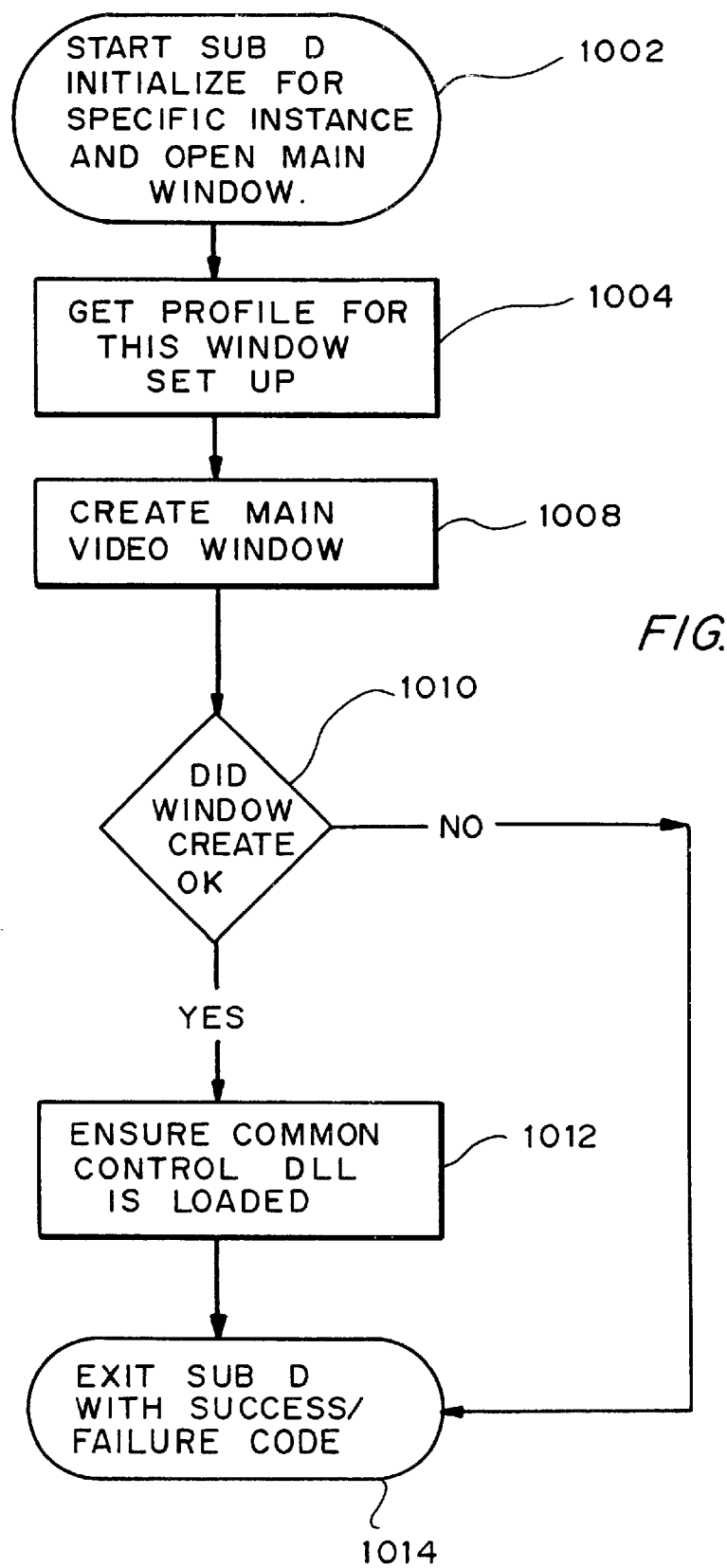
FIG. 10 is a flow chart describing the steps of a main window subroutine in a preferred embodiment of software according to the present invention.

FIG. 10 is a flow chart illustrating subroutine D, which is called from other points in the program. The subroutine begins at step 1002. At step 1004, the software obtains the profile for the window set-up. Specifically, the software obtains the size of the window and the current input settings for the window. These are usually saved from a previous session. If no settings have been saved, the software will use default window settings. The main video window is created at step 1008. If the main window is properly created, the software goes to step 1010. Otherwise, the subroutine exits with a failure code. Once the window is created, however, program control continues at step 1012 where the software ensures that the Windows 95 common control DLL is loaded. The common controls are an extended set of controls, such as drag list boxes, rich edit controls, and toolbars, that are used by the software. If the common control DLL is properly loaded, the subroutine exits with a success code at step 1014.

Figure 11:
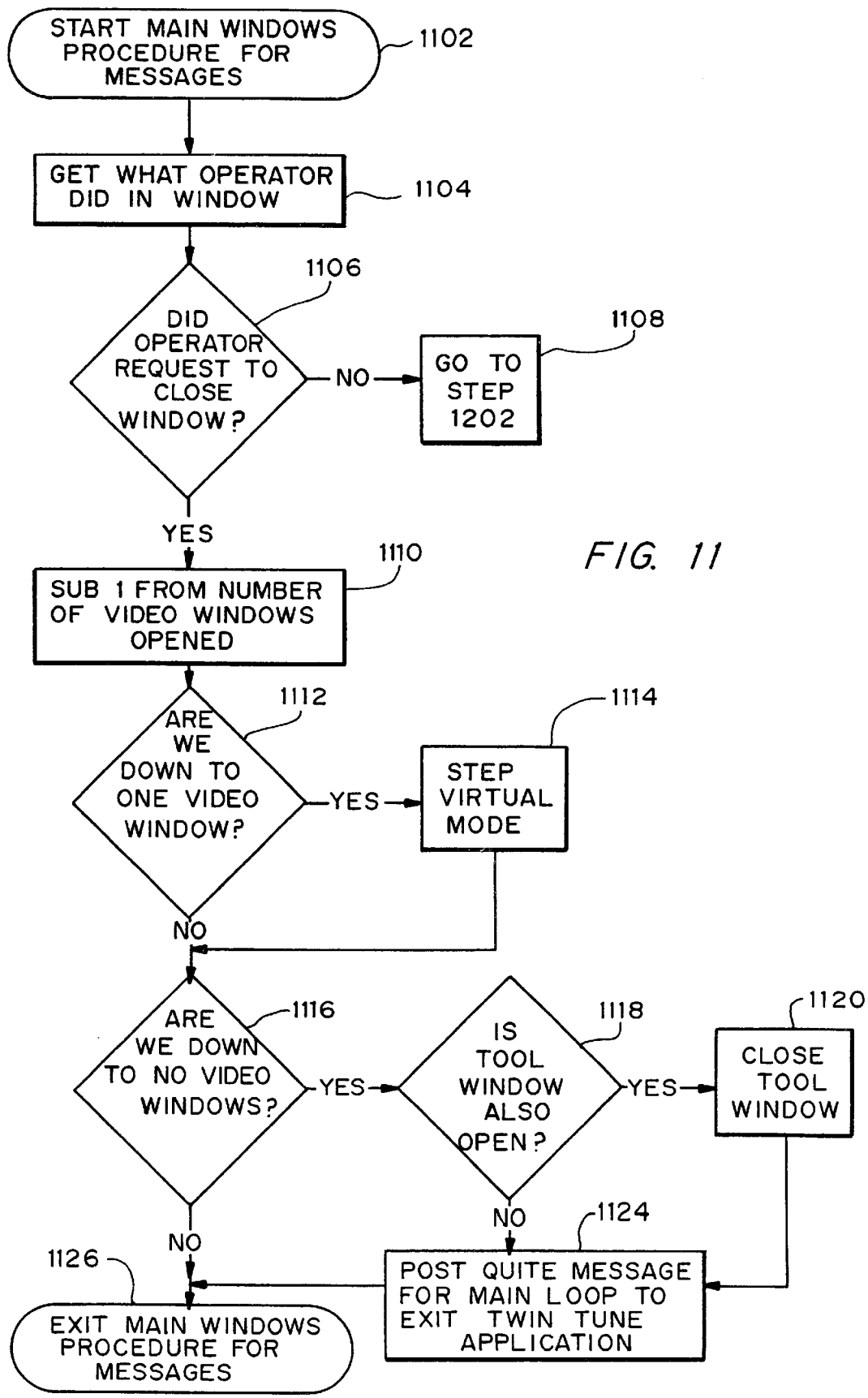
FIG. 11 is a flow chart illustrating control flow of the main Windows procedure for the software.

FIG. 11 is a flow chart illustrating control flow of the main Windows procedure for the software. The Windows procedure is called by Windows 95 when it needs to pass a message to the software. It is through this function that Windows 95 communicates with the program. The Windows function may be implemented in many ways, but it often consists of a "switch" statement that links a specific response to each message that the program will respond to. In step 1104, the software obtains the user's action within the main window. In step 1106, the software determines whether the user requested to close a window. If the user requested that the window be closed, processing continues at step 1202. Otherwise, processing continues at step 1110, where the software subtracts one from the total number of open windows. If only one window remains open, the software places the open window in virtual mode in step 1114. Virtual mode allows a single video window to be moved from one display to another or sized to fit on more than one display. This mode allows more than one video window to be opened at one time. If no video windows are open following step 1110, the software goes to step 918 to determine whether the tool window remains open. If the tool window is open, the software closes the tool window in step 1120. Once the tool window is closed, (or if the tool window was not open in step 1118), the windows procedures calls the PostQuitMessage( ) function of the operating system which, in turn, causes a WM_QUIT message to be sent to the software. Once a WM_QUIT message is received, the software automatically halts. The Windows procedure exits at step 1126.

Figure 12:
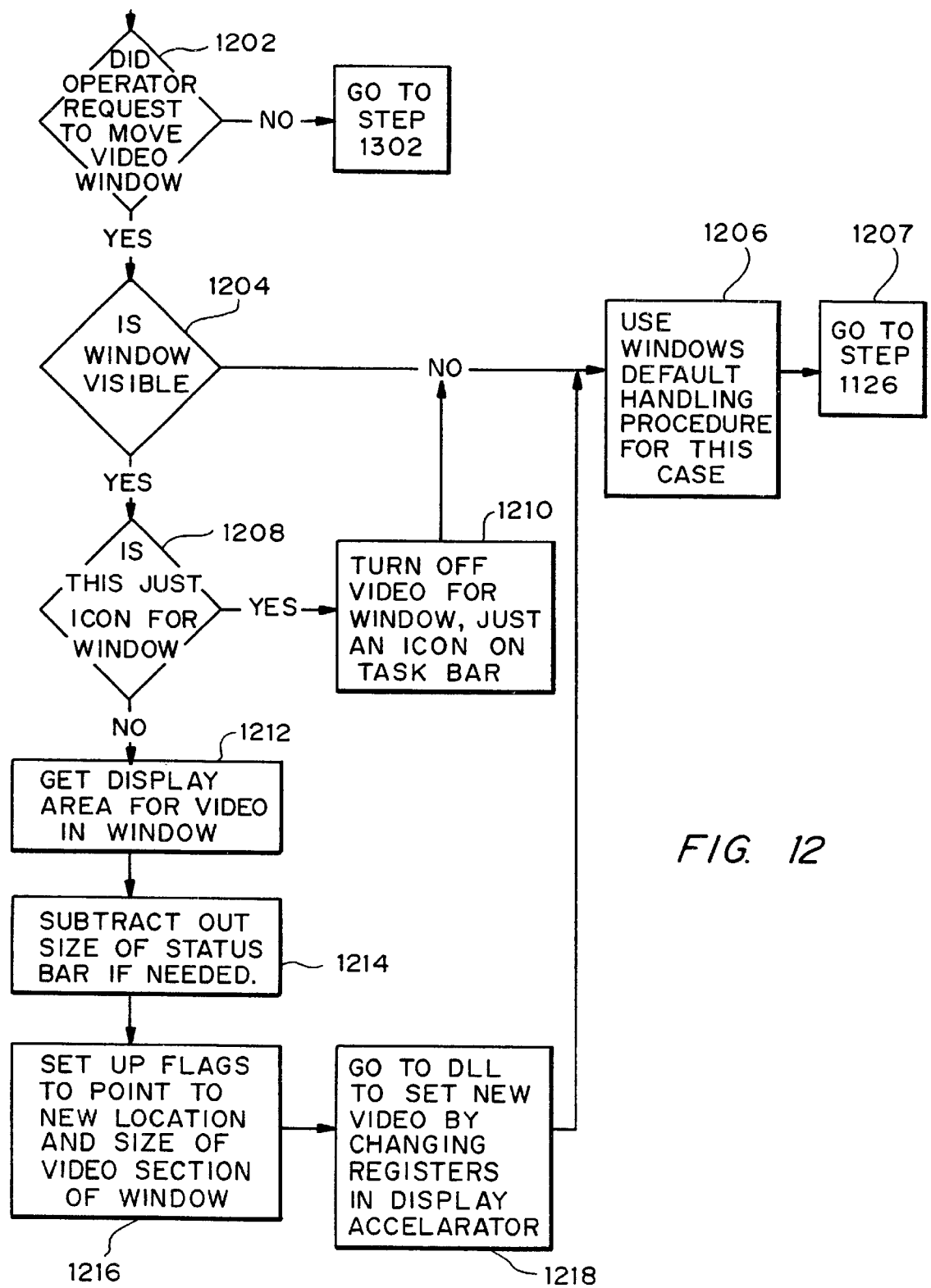
FIG. 12 illustrates processing that occurs when the user requests that a window be moved in a preferred embodiment of software according to the present invention.

FIG. 12 illustrates processing that occurs when the user requests that a window be moved. In step 1202, the software determines whether or not the user requested that a video window be moved. If a move was not requested, processing continues at step 1302. Otherwise, the software ensures that the video window is currently visible. If the window is not visible, the default Windows processing occurs (via a call to DefWindowProc( )). If the window is visible, the software ensures that the window is not simply an icon in step 1208. In step 1210, if the video cannot be displayed on the screen, such as by minimizing, the software turns off any video that is being sent to the window. In step 1212, the software obtains the display area for the video in the window. Next, the size of the status bar for the window is subtracted from the area. In step 1216, the software creates flags to point to the new location and size of the video portion of the window. The software then enters the DLL to set the new video by modifying the registers in the display adapter accelerator associated with a given window. If the window is the first-opened window, the registers in graphics accelerator 210 are modified. If the window is the second-opened window, the registers in graphics accelerator 235 are modified. All other messages for moving are sent to the default handling for the Windows procedure.

Figure 13:
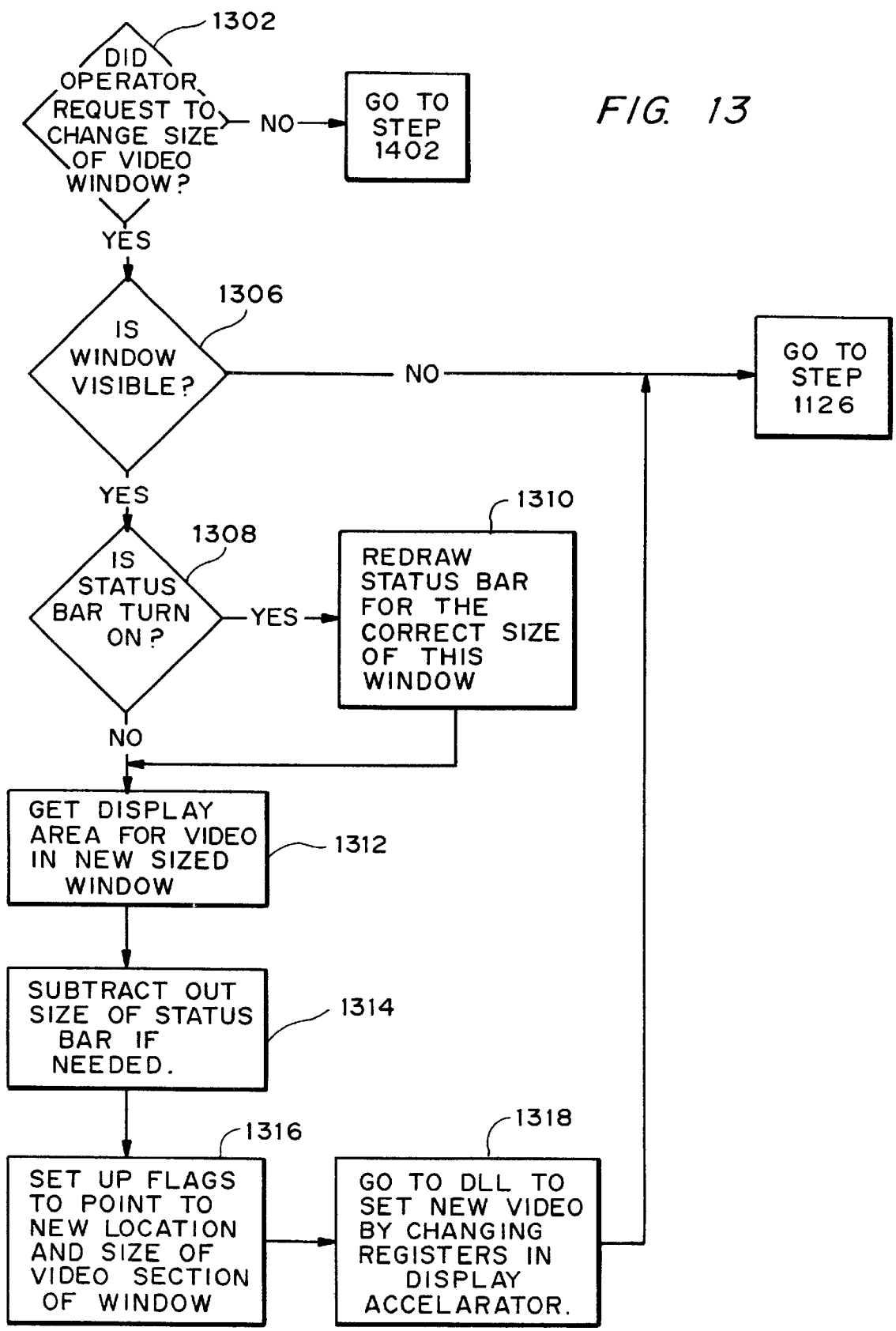
FIG. 13 illustrates processing that occurs when the user requests that the window be re-sized in a preferred embodiment of software according to the present invention.

FIG. 13 illustrates processing that occurs when the user requests that the window be re-sized. The software, in step 1302, determines whether the user requested that the size of the window be modified. If the user did not request a window re-sizing, processing continues at step 1402. Otherwise, the software determines whether the window to be sized is visible. If the window is not visible, the default Windows procedure handling is used. If the window is visible, the software ensures that the status bar is visible. If the status bar is visible, the software redraws the status bar for the correct window size in step 1310. If the status bar is not present, the software obtains the display area for the video in the newly-sized window. The size of the status bar is subtracted from the total area in step 1314. In step 1316, the software creates flags to point to the new location and size of the video portion of the window. The software then enters the DLL to set the new video by modifying the registers in the display adapter accelerator. If the window is the first-opened window, the registers in graphics accelerator 210 are modified. If the window is the second-opened window, the registers in graphics accelerator 235 are modified. All other messages are sent to the default handling for the Windows Procedure.

Figure 14:
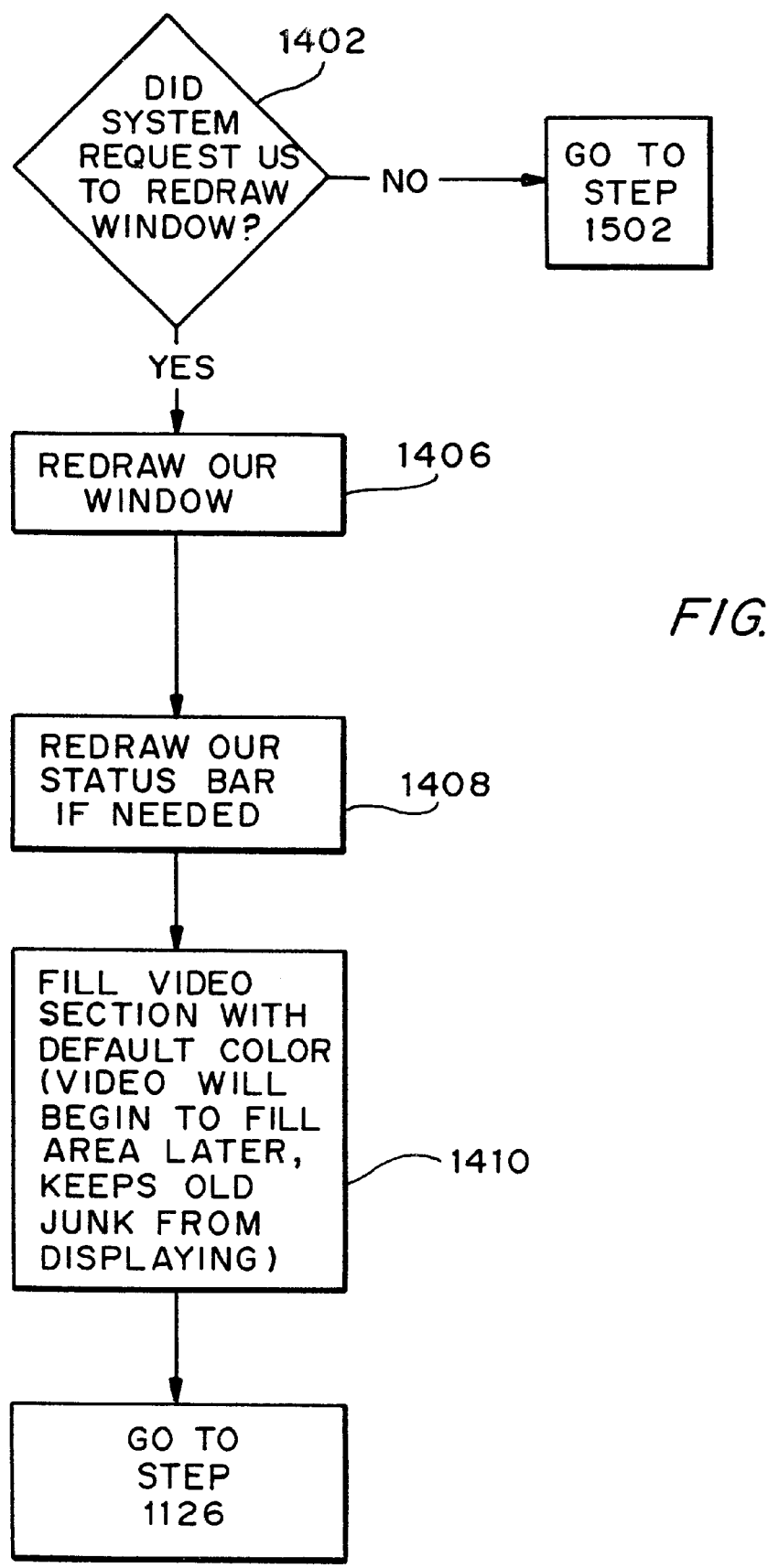
FIG. 14 illustrates processing that occurs when the system requests a window redraw in a preferred embodiment of software according to the present invention.

FIG. 14 illustrates processing that occurs when the system requests a window redraw. The software, in step 1402, determines whether the operating system requested a redrawing of the window. If a redraw is not requested, processing continues at step 1502. In step 1406, the software redraws the main window. In step 1408, the software redraws the status bar if the status bar is visible. The software, in step 1410, fills the video section of the window with a default color. This step is performed to prevent previous material from displaying in the area. When new video signals are received, the new video picture will fill the redrawn area. Program control continues at step 1126.

Figure 15:
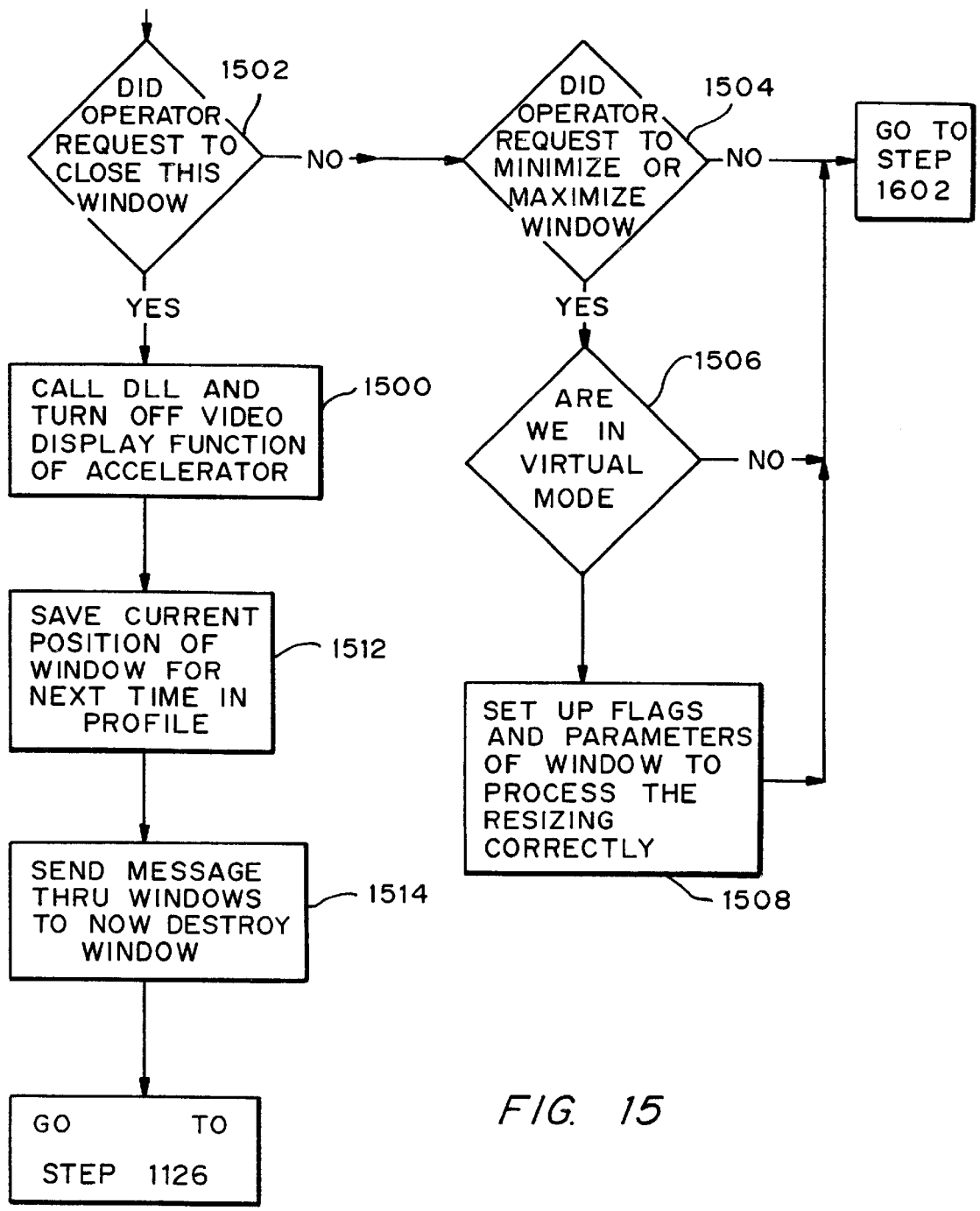
FIG. 15 illustrates processing that occurs when the user requests that a window be closed in a preferred embodiment of software according to the present invention.

FIG. 15 illustrates processing that occurs when the user requests that a window be closed. In step 1502, the software monitors a request to close the window. If no request to close the window is made, the software goes to step 1602. If no request is made to minimize or maximize the window, the software checks to see if the system is in virtual mode. If the system is in virtual mode, the software creates flags and parameters for the window to correctly process the resizing. Program control then continues at step 1602. If the user requests that a window be closed, the software goes to step 1510 and calls the DLL to turn off the video display function of the accelerator. In step 1512, the program saves the current position of the window for later use. In step 1514, the software sends a message to destroy the window to the operating system. The software then exits the main window procedure.

Figure 16:
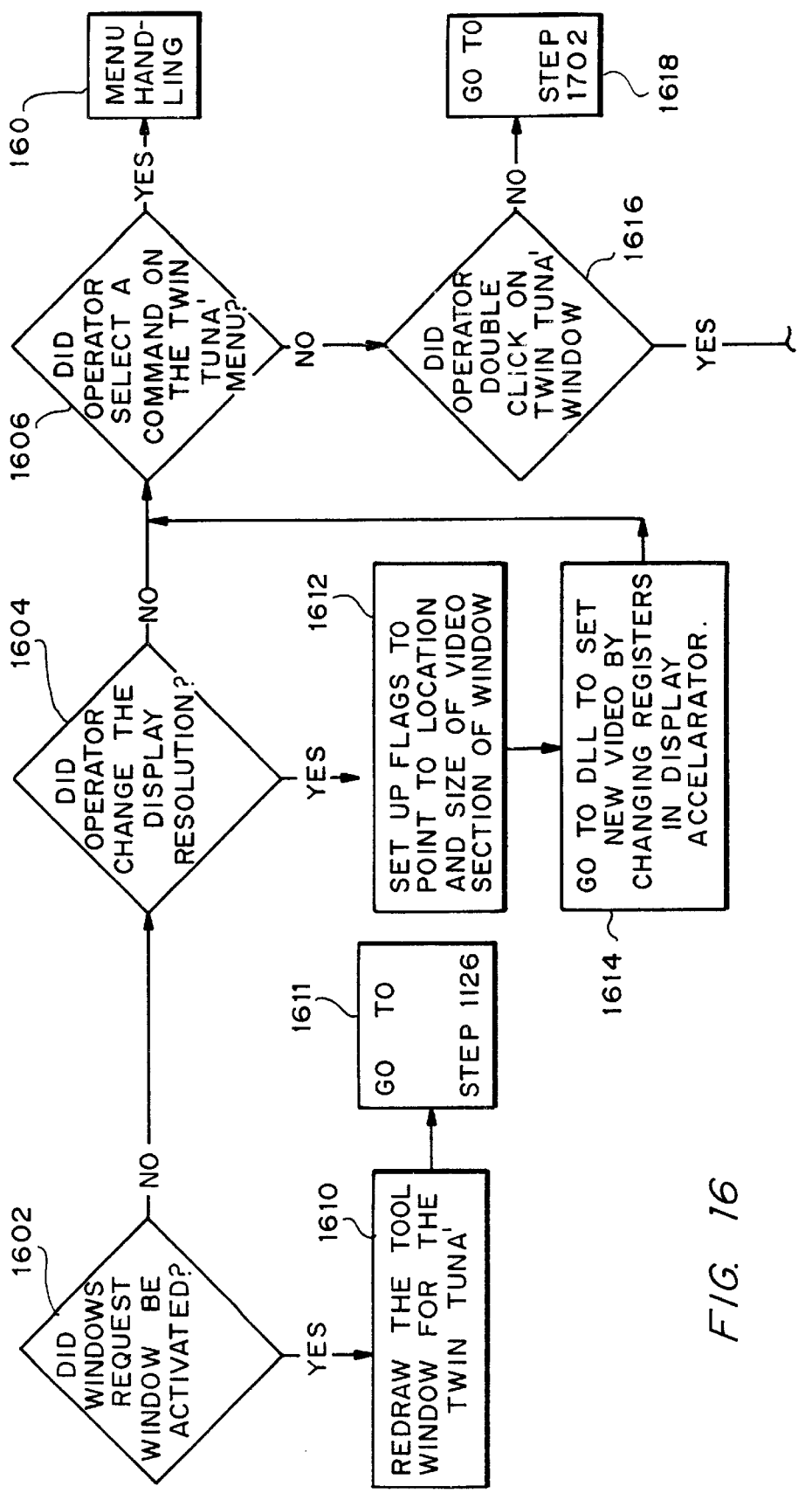
FIG. 16 illustrates processing that occurs when the user opens a menu in a preferred embodiment of software according to the present invention.
Figure 16A:
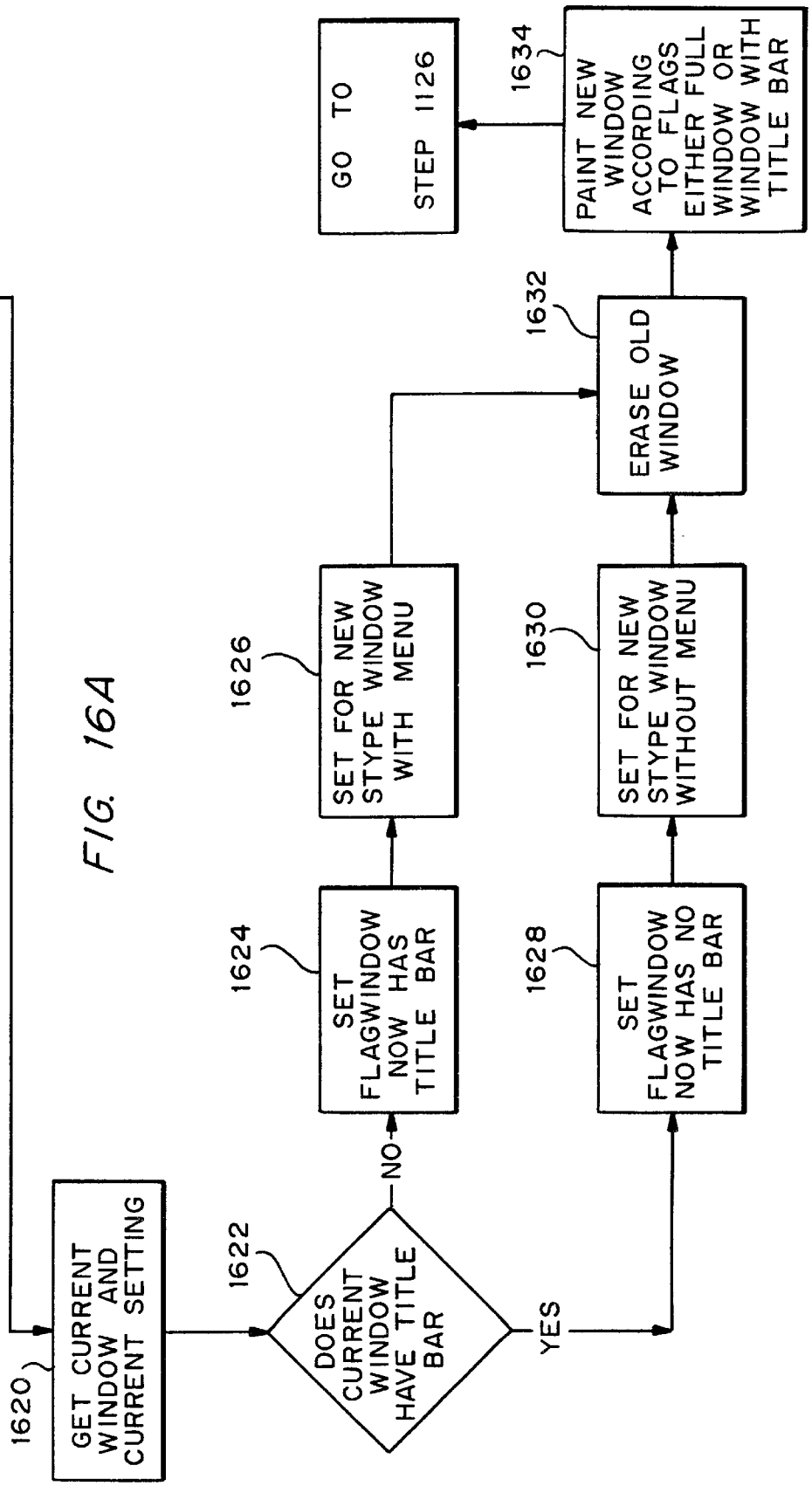

FIG. 16 illustrates processing that occurs when the user opens a menu. In step 1602, the software determines whether the operating system requested that a window be activated. If no request from the operating system was received, the software monitors a change in the display resolution at step 1604. If no change to the display resolution is made, the system looks for the selection of a command on the software menu at step 1606. Menu processing is discussed below. If the operating system requests that a window be activated, the software, in step 1610, updates the tool window and exits the Window procedure. If the user changes the display resolution, the software, in step 1612, creates flags to point to the location and size of the video portion of the window. In step 1614, the software enters the DLL to set the new video modifying the registers in the display accelerator. Processing then goes to step 1606.

If the user does not select a command on the menu, the software looks for a double-click in the window. If no double-click is received, the software continues at step 1702. If a double-click is received, the software, in step 1618, obtains the current window and current setting. In step 1620, the software looks for a title bar in the window. If the window has no title bar, the software, in step 1624, sets a NO_MENU flag to provide a title bar for the window. The window is also given a menu in step 1626. The old window is then erased. If the window has a current title bar, a flag is set to remove the title bar. The new window is modified to remove the menu in step 1630 and the old window is then erased. In step 1634, the new window is painted according to the set flags (i.e., either a full window or a window with a title bar and menu).

Figure 17:
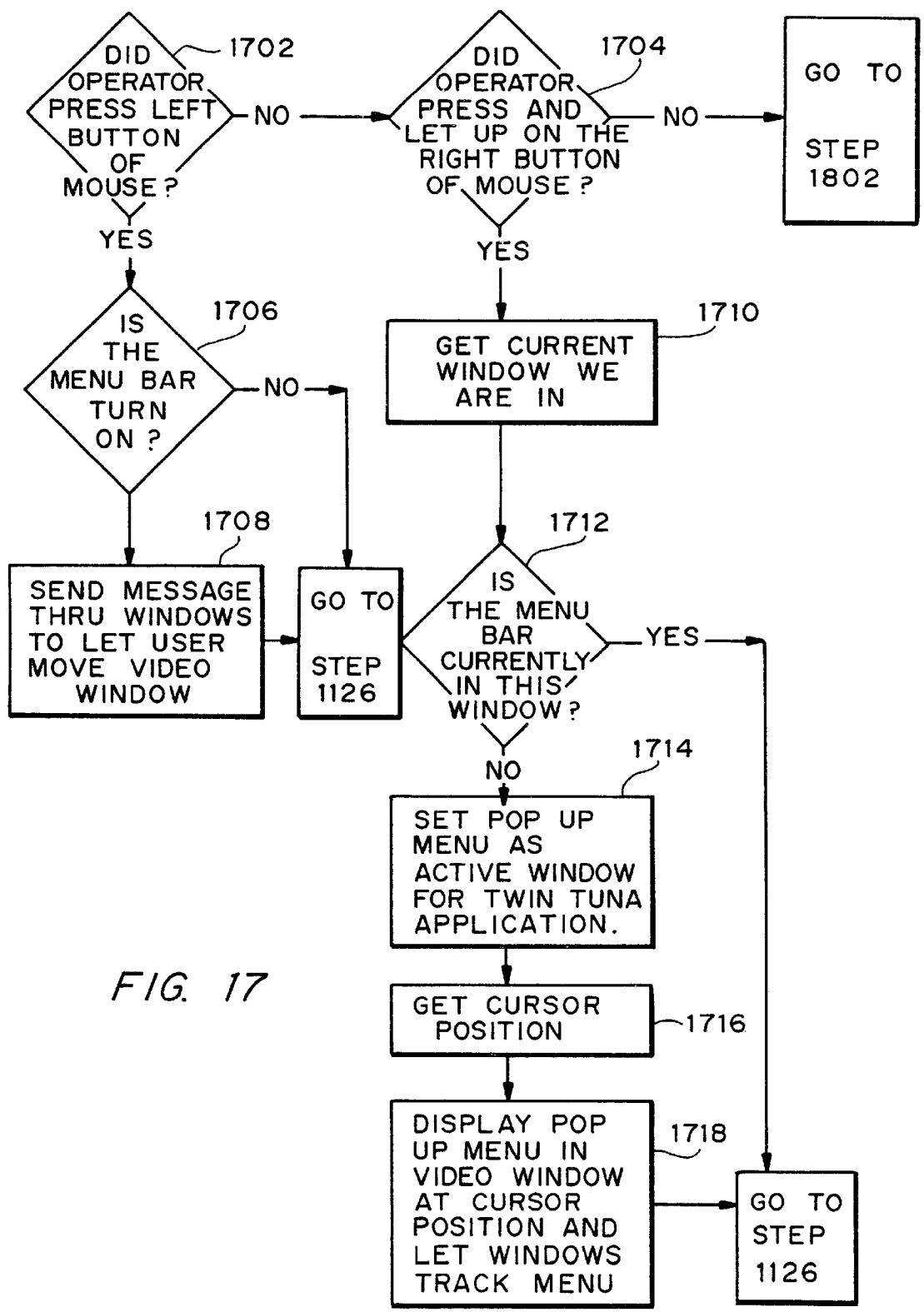
FIG. 17 is a flow chart illustrating processing that occurs when the user clicks a mouse button in the main window in a preferred embodiment of software according to the present invention.

FIG. 17 is a flow chart illustrating processing that occurs when the user clicks a mouse button in the main window. In step 1702, the software looks for a left mouse button click. If no left mouse button click is received, the software looks for a right mouse button click in step 1704. If a left mouse button click is received, the software determines whether the menu bar is on or off. If the menu bar is off, messages are sent through Windows to allow the user to move the video window in step 1708. If the menu bar is on, the Windows procedure exits. If a right mouse button click is received, the software obtains the current window the user is in. If no menu bar is on in the current window, the software creates the pop-up menu described above as the active window of the application in step 1714. The software then obtains the current cursor position in step 1716. Finally, the software displays the pop-up menu in the video window at the cursor position and allows Windows 95 to track the menu. The Windows procedure then exits.

Figure 18:
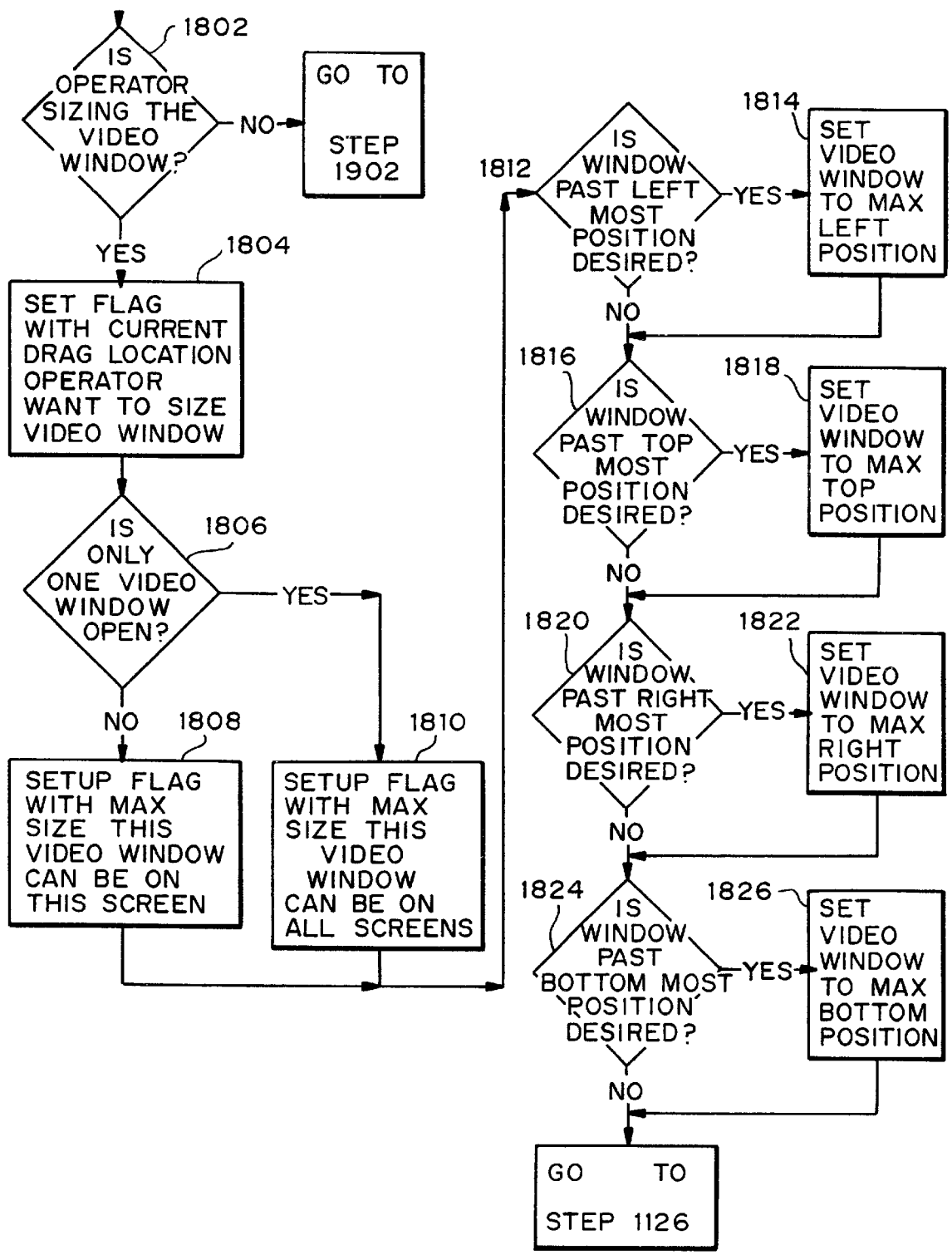
FIG. 18 illustrates processing that occurs during sizing of a video window in a preferred embodiment of software according to the present invention.

FIG. 18 illustrates processing that occurs when the user sizes a video window. If no right or left mouse button is received and no double-click is received, the software determines whether the user is sizing the video window at step 1802 in FIG. 16. If the user is not sizing the video window, processing continues at step 1902. Otherwise, the software, at step 1806, creates a flag with the current drag location where the user would like to size the window. If only one video window is open, a flag is created with the maximum size that the current window can be on all screens. If other windows are open, the software, in step 1808, creates a flag with the maximum size the video window can be on this screen alone. In steps 1812–1826, the software determines whether the window is sized past the farthest desired point. If the window is beyond that point, the video window is set to the maximum desired position. The Windows procedure then exits.

Figure 19:
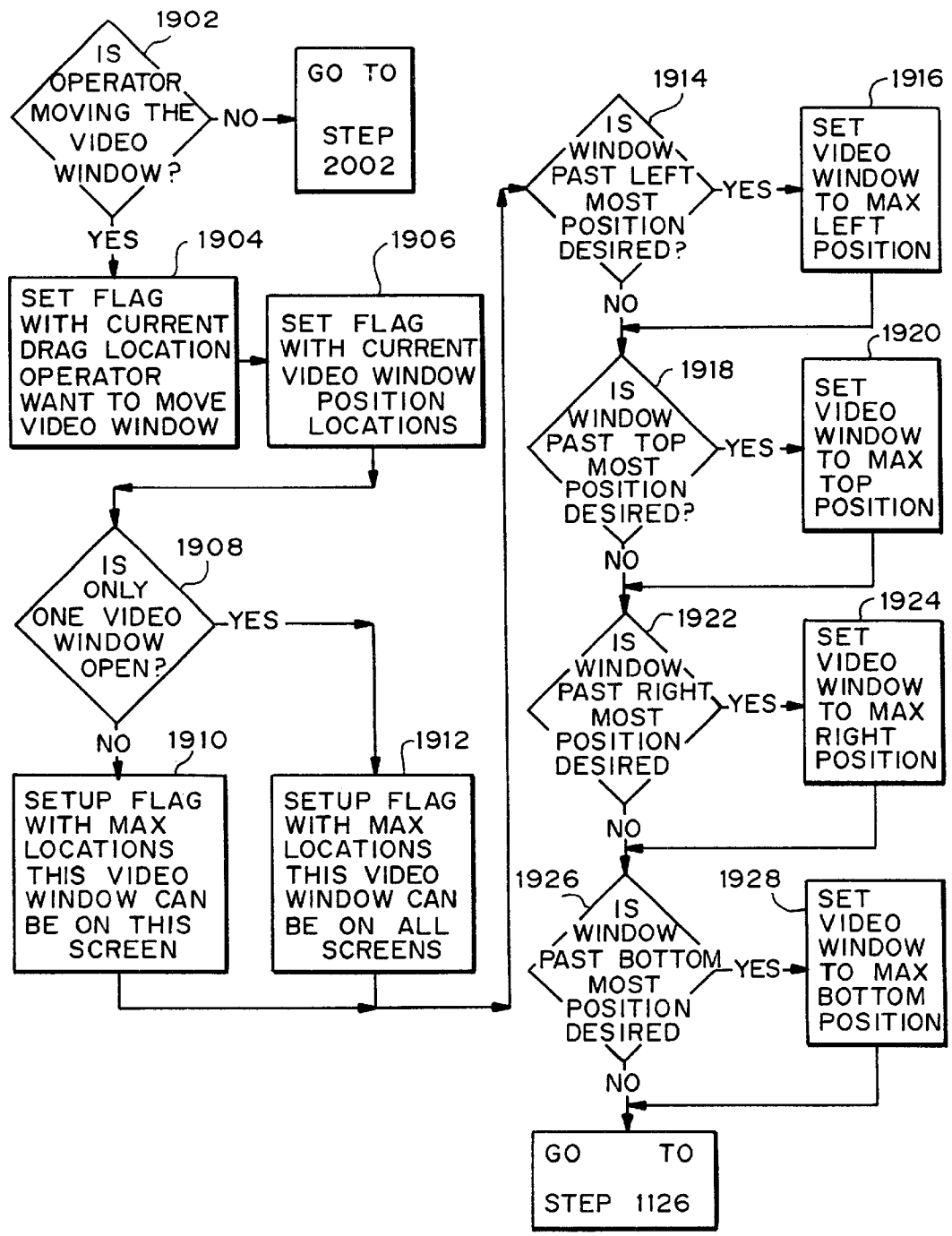
FIG. 19 is a flow chart illustrating processing that occurs during moving of a video window in a preferred embodiment of software according to the present invention.

FIG. 19 is a flow chart illustrating processing that occurs during moving of a video window. In step 1902, the software determines whether the user is moving the video window. If the user is not moving the video window, the software looks for a system message in step 2002. If the user is moving the video window, the software, in step 19046, creates a flag with the current location to which the window has been dragged by the user. In step 1906, the software creates a flag with the current video window position location. If only one video window is open, a flag is created with the maximum size that the current window can be on all screens. If other windows are open, the software, in step 1912, creates a flag with the maximum size the video window can be on this screen alone. In steps 1914–1928, the software determines whether the window is past the farthest desired point. If the window is beyond that point, the video window is set to the maximum desired position. The Windows procedure then exits.

Figure 20:
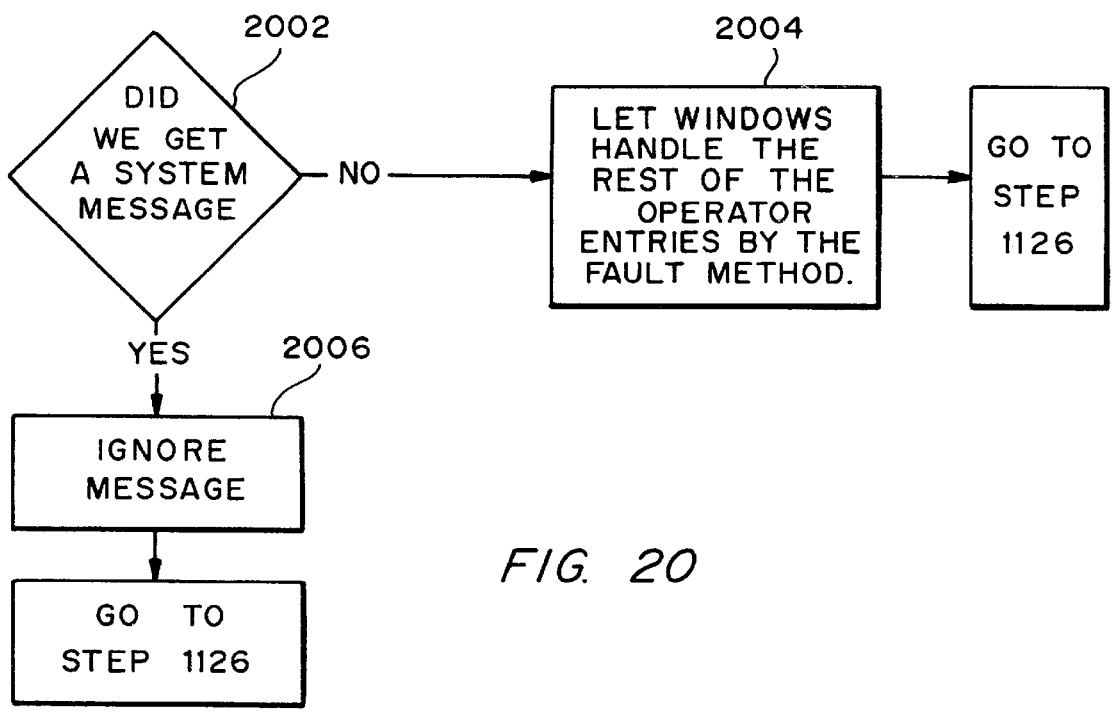
FIG. 20 is a flow chart illustrating the handling of system messages in a preferred embodiment of software according to the present invention.

FIG. 20 is a flow chart illustrating the handling of system messages by the software. If a system message is not received, the software, in step 2004, allows windows to handle all remaining user entries by the default method. If a system message is received, the software ignores the message in step 2006. The Windows procedure then exits.

Figure 21:
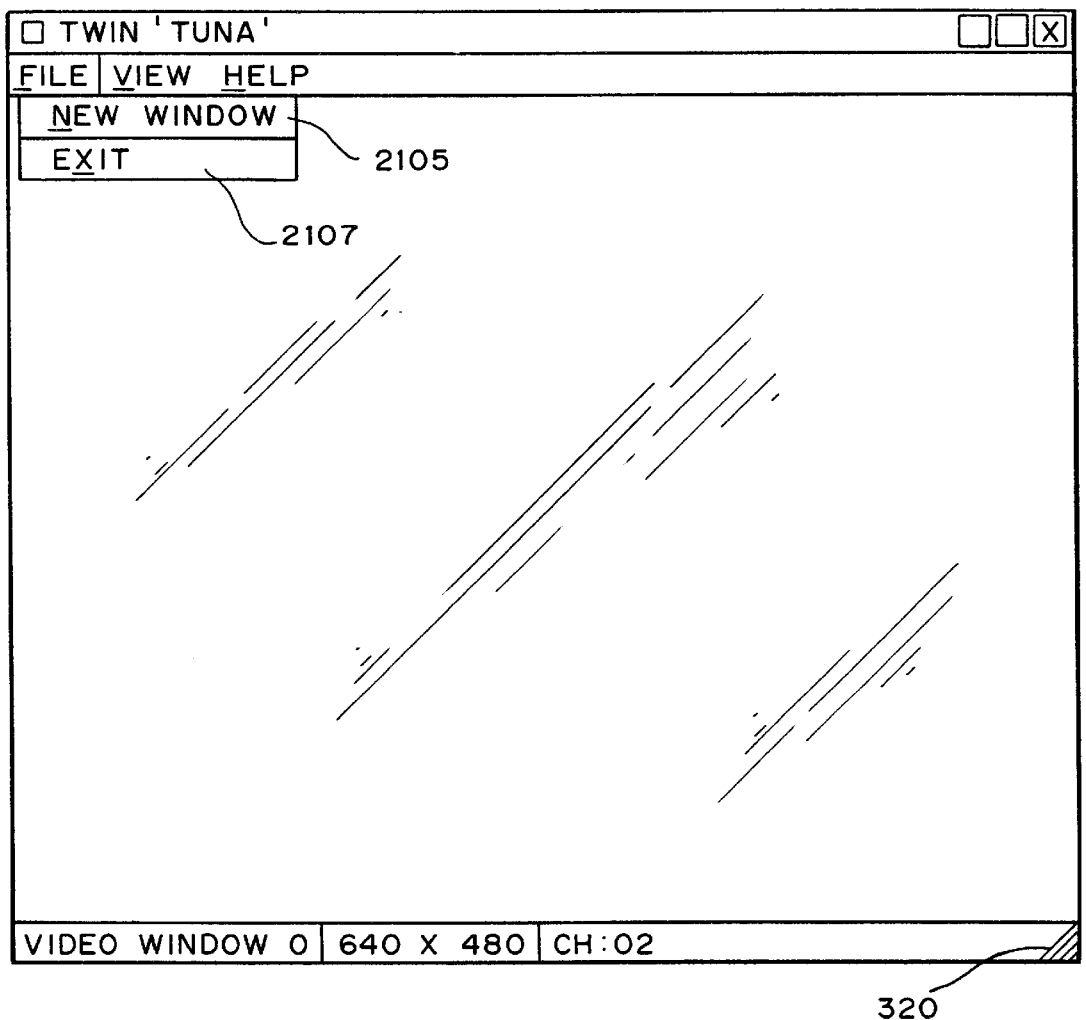
FIG. 21 illustrates a File Menu displayed when the user selects "File" from the main program menu in a preferred embodiment of software according to the present invention.

Menu control flow will now be described. FIG. 21 illustrates a File Menu displayed when the user selects "File" from the main program menu. The File Menu 2102 includes three menu items: a "New Window" menu item 2105, a blank line, and an "Exit" menu item 2107. When "New Window" is selected, the software opens a new window containing data from a new video source. The new window is opened on the next available monitor. The selection of audio and video sources will be described below. The program terminates when the user selects "Exit" from the File menu 2102.

Figure 22:
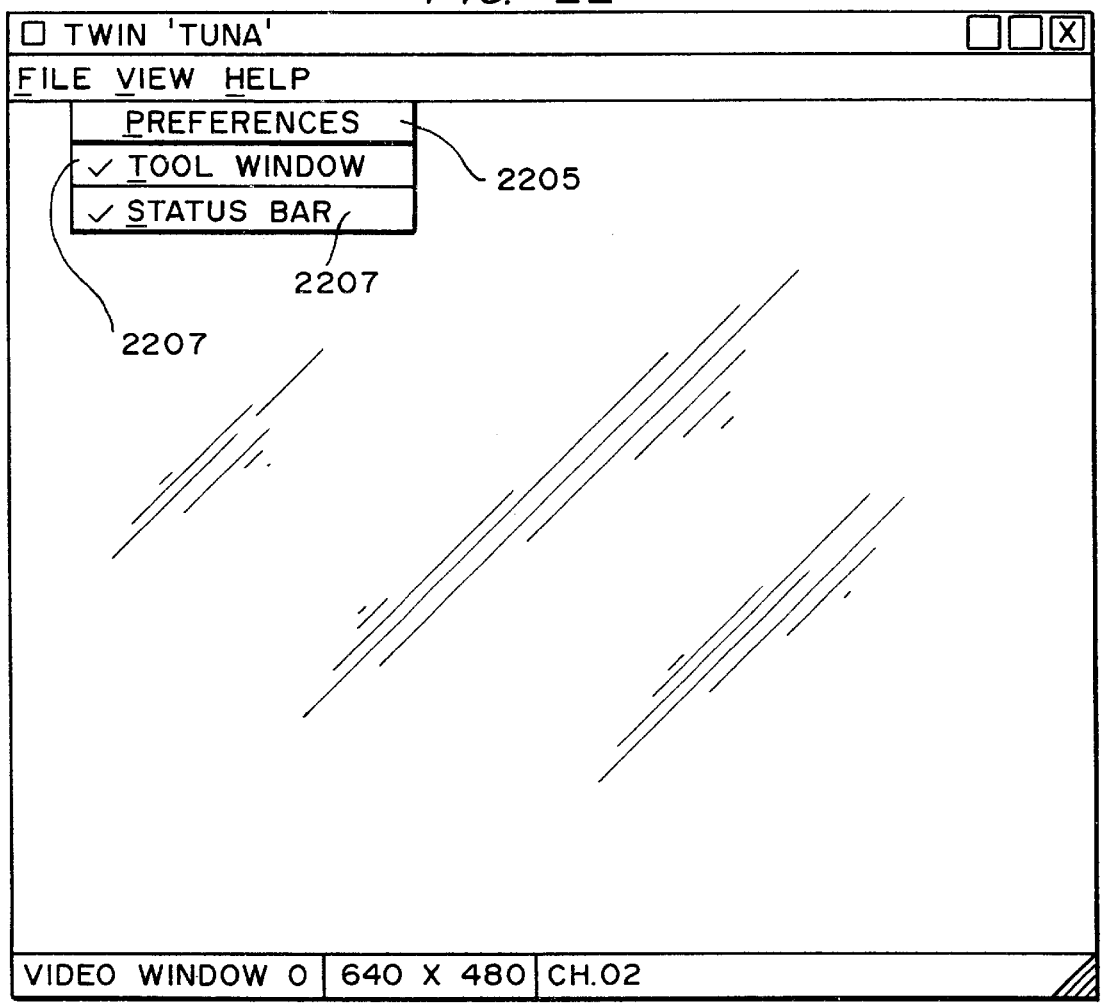
FIG. 22 illustrates a View Menu displayed when the user selects "View" from the main program menu in a preferred embodiment of software according to the present invention.

FIG. 22 illustrates a View Menu displayed when the user selects "View" from the main program menu. The View Menu includes three menu items: a "Preferences" menu item 2205, a "Tool Window" menu item 2207, and a "Status Bar" menu item 2209. When the Preferences menu item 2205 is selected, the software creates a dialog box containing the current setting for tuner input. Specifically, the dialog box indicates whether an air antenna or cable is selected. In addition, the type of cable selected is displayed. The user also has the option of keeping the Tool Window on top of multiple windows. Other information may be included in the Preferences menu, such as the audio connections, external video names, etc.

When the "Tool Window" item 2207 is selected from the Preferences menu, a check is entered next to the item and a Tool Window 2302 (see FIG. 23) is displayed. When the "Status Bar" menu item 2209 is selected, the status bar 320 is displayed. Both the Tool Window and the status bar may be toggled on and off.

Figure 23:
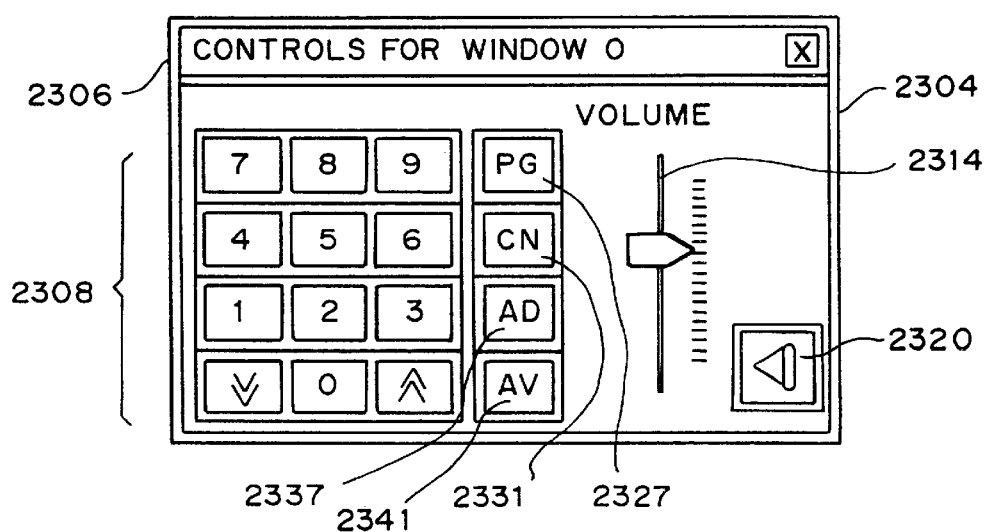
FIG. 23 illustrates a Tool Window 2302 that is displayed when the user selects "Tool Window" from the View Menu or from the Pop-up menu in a preferred embodiment of software according to the present invention.

FIG. 23 illustrates a Tool Window 2302 that is displayed when the user selects "Tool Window" from the View Menu or from the Pop-up menu. The Tool Window contains a title bar 2306 and a main window 2304. The main window 2304 includes a keypad 2308, a volume slider 2314, and a mute button 2320. The keypad 2308 allows the user to select particular audio and video settings for the active window. The keypad 2308 includes a "PC" button 2327 that allows the user to select the previously-tuned channel. A "CN" button 2331 allows the user to modify the name of the channel (e.g., "ABC") for the currently-tuned channel. The "AD" button 2337 allows the user to modify the audio characteristics of the active window. The "AV" button 2341 opens an audio/video window 2402 that is discussed in greater detail below. The volume slider 2314 allows the user to increase or decrease the volume within a particular window. The volume slider 2314 controls the volume for either window. The volume may be muted by pressing the mute button 2320.

Figure 24:
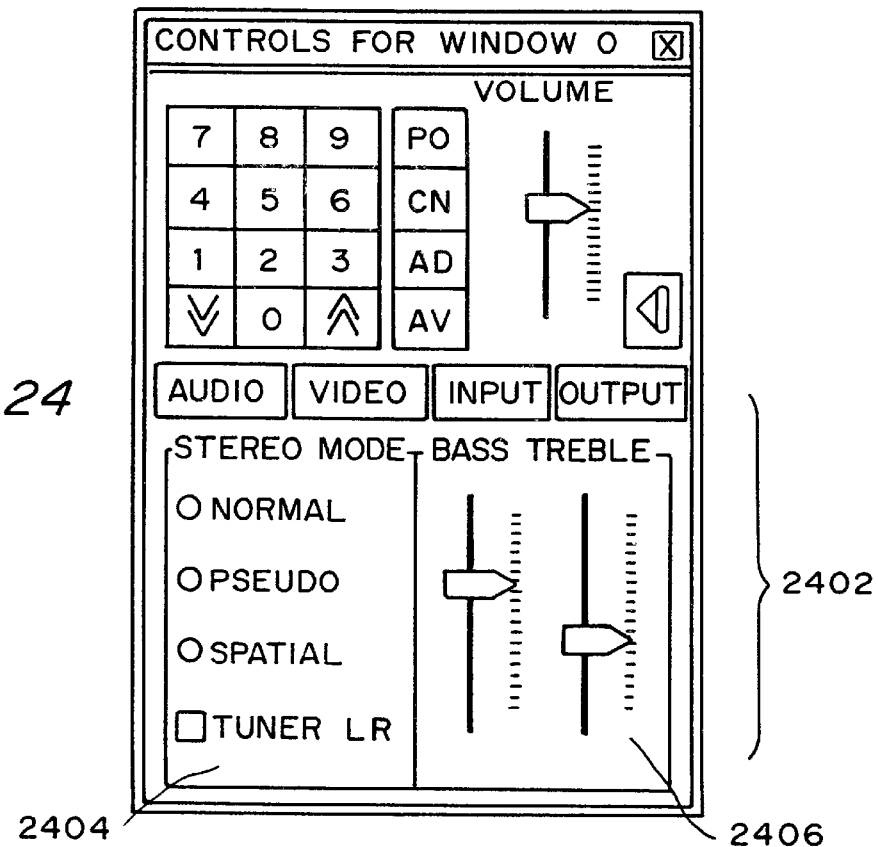
FIG. 24 illustrates the Tool Window when an audio button is selected in a preferred embodiment of software according to the present invention.

When the user selects the "AV" button 2341 on the keypad 2308, an audio/video window 2402. The audio/video window 2402 allows the user to select particular audio and video input and output sources. In addition, the window 2402 allows the user to select specific audio and video characteristics of the active window. FIG. 24 illustrates the Tool Window when an audio button is selected. A stereo mode window 2404 lets the user select a particular stereo mode from a group of radio buttons. The user may select "Normal," "Pseudo," or "Spatial" stereo mode. In addition, the user may select the tuner LR check box that allows the user to hear both left and right audio simultaneously. A bass/treble window 2406 includes two slider controls for allowing the user to increase or decrease the amount of bass and/or treble in the volume. All audio selections are sent to the audio multiplexer and sound processor 295 via the control buses 237, 239.

Figure 25:
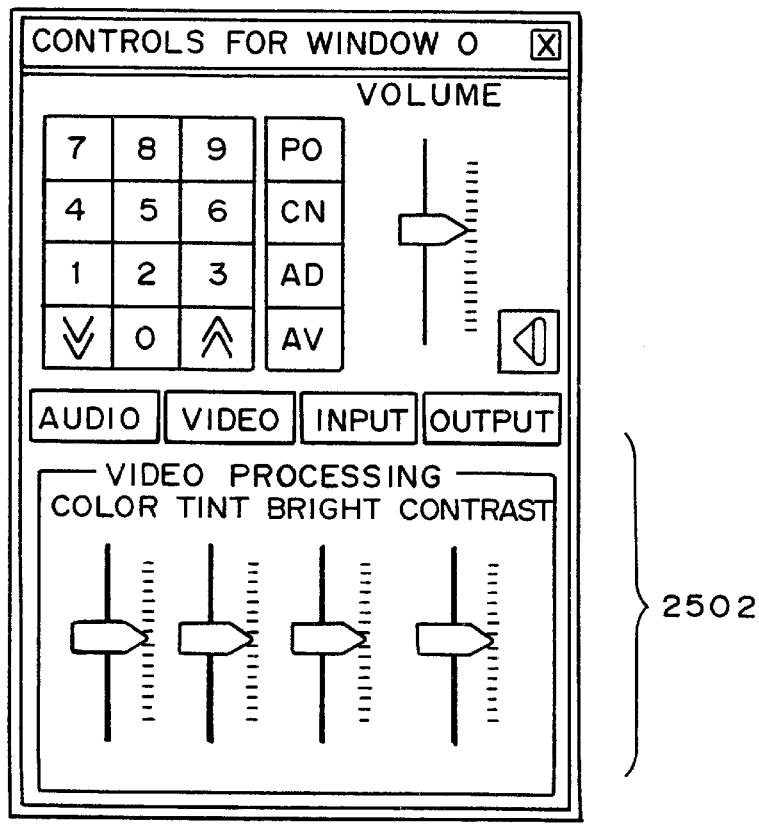
FIG. 25 illustrates the Tool Window when the user selects a video button in a preferred embodiment of software according to the present invention.

FIG. 25 illustrates the Tool Window when the video button in the Tool Window is selected. A video window 2502 opens allowing the user to adjust the video characteristics of the active window. Specifically, the user may adjust the color, tint, brightness, and contrast of the display using one or more slider controls.

Figure 26:
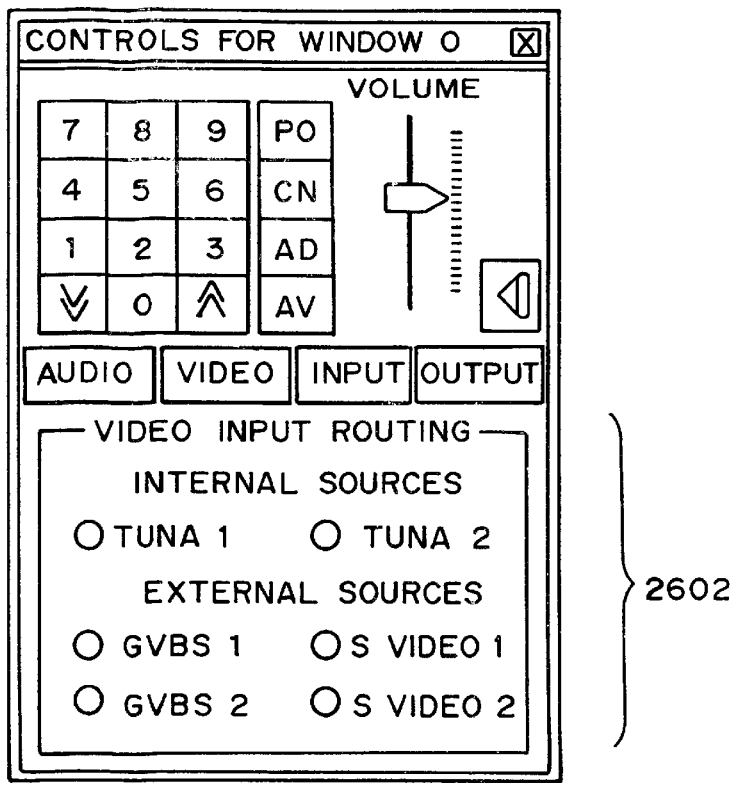
FIG. 26 illustrates the Tool Window when the user selects an input button in a preferred embodiment of software according to the present invention.

FIG. 26 illustrates the Tool Window when the user selects an input button. A video input routing window 2602 allows the user to use either internal or external sources for the video. If an internal source is selected, the user may toggle back and forth between two open screens using the "Tuner 1" or "Tuner 2" radio buttons. If an external source is selected, the user may select among two CVBS inputs and two S-Video inputs.

Figure 27:
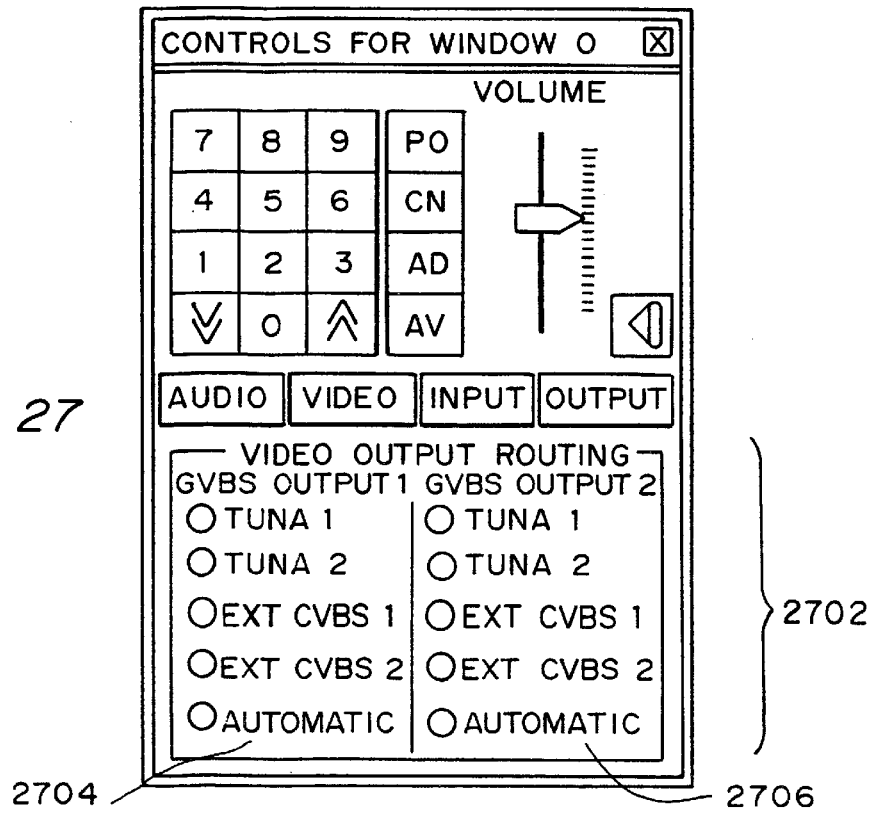
FIG. 27 illustrates the Tool Window when the user selects an output button in a preferred embodiment of software according to the present invention.

FIG. 27 illustrates the Tool Window when the user selects an output button. A video output routing window 2702 opens allowing the user to send the input source to one or more different output cables. Options for the first output cable are represented in the CVBS Output 1 window 2704. Options for the second output cable are represented in the CVBS Output 2 window 2706. Both output cables may display information from the Tuner 1 input, the Tuner 2 input, the external CVBS 1 input, and the external CVBS 2 input. An automatic button makes the first cable follow the first video window and the second video cable follow the second video window.

Having thus described a preferred embodiment of a video adapter, it should be apparent to those skilled in the art that certain advantages have been achieved. It should also be appreciated that various modifications, adaptations, and alternative embodiments thereof may be made within the scope and spirit of the present invention. For example, analog video signals have been illustrated, but it should be apparent to those skilled in the art that the teachings described herein would be applicable to digital video signals as well. The invention is further defined by the following claims:

What is claimed is:

1. A product for installation in a computer for receiving at least one television programming input and displaying television programming corresponding thereto on multiple television monitors, comprising:
   a. at least one television programming input port for coupling at least one source of television programming to said product;
   b. at least one television tuner;
   c. a video multiplexer coupled to the television tuner and adapted to be coupled to a plurality of television monitors, said video multiplexer also adapted to be coupled to a bus of the computer in which the product is adapted to be installed; said multiplexer also adapted to receive television programming and feed said programming to said television monitors, according to commands entered into said computer and sent to said multiplexer via said bus.

2. A product according to claim 1 further comprising:
   d. a video encoder for converting at least some of said television programming to digital format;
   e. video monitor interface circuitry adapted to receive said television programming in digital format, adapted to be coupled to the bus of the computer and adapted to feed said television programming in digital format to at least one computer monitor, according to commands entered into said computer and sent to said interface circuitry via said bus.

3. A product according to claim 2 further comprising:
   f. a graphics accelerator adapted to receive signals from the computer corresponding to computer generated graphics and to receive television programming in digital format;
   g. a video decoder adapted to receive signals from said graphics accelerator and based on them, prepare combined television programming corresponding to said computer generated graphics and television programming; and
   h. wherein said video multiplexer is adapted to receive said combined television programming for feeding to the multiple television monitors.

4. A product for installation in a computer for receiving at least one television programming input and displaying the television input in said input on multiple television monitors, comprising:
   a. at least one television programming input port for coupling at least one source of television programming to said product;
   b. at least one television tuner;
   c. a video multiplexer coupled to the television tuner and adapted to be coupled to a plurality of television monitors, said video multiplexer also adapted to be coupled to a bus of the computer in which the product is adapted to be installed; said multiplexer also adapted to receive television programming and feed said programming to said television monitors, according to commands entered into said computer and sent to said multiplexer via said bus;
   d. a video encoder for converting at least some of said television programming to digital format;
   e. video monitor interface circuitry adapted to receive said television programming in digital format, adapted to be coupled to the bus of the computer and adapted to feed said television programming in digital format to at least one computer monitor, according to commands entered into said computer and sent to said interface circuitry via said bus;
   f. a graphics accelerator adapted to receive signals from the computer corresponding to computer generated graphics and to receive television programming in digital format;
   g. a video decoder adapted to receive signals from said graphics accelerator and based on them, prepare combined television programming corresponding to said computer generated graphics and television programming; and
   h. wherein said video multiplexer is adapted to receive said combined television programming for feeding to the multiple television monitors.

5. A product according to claim 4 in which said interface circuitry is adapted to feed at least one computer monitor with content corresponding to computer generated graphics and television programming.

6. A product for installation in a computer for receiving at least one television programming input and displaying television programming corresponding thereto on multiple television monitors, comprising:
   a. at least one television programming input port for coupling at least one source of television programming to said product;
   b. a video multiplexer adapted to be coupled to a plurality of television monitors, said video multiplexer also adapted to be coupled to a bus of the computer in which the product is adapted to be installed; said multiplexer also adapted to receive television programming and feed said programming to said television monitors, according to commands entered into said computer and sent to said multiplexer via said bus;
   c. a video encoder for converting said at least some of said television programming to digital format;
   d. at least one graphics accelerator adapted to receive signals from the computer corresponding to computer generated graphics and to receive television programming in digital format;
   e. at least one video decoder adapted to receive signals from said graphics accelerator and based on them, prepare combined television programming corresponding to said computer generated graphics and television programming; and
   f. wherein said video multiplexer is adapted to receive said combined television programming for feeding to the multiple television monitors.

7. A product according to claim 6 further comprising video monitor interface circuitry adapted to receive said television programming in digital format, adapted to be coupled to the bus of the computer and adapted to feed said television programming in digital format to at least one computer monitor, according to commands entered into said computer and sent to said interface circuitry via said bus.

8. A product according to claim 6 further comprising at least one television tuner.

9. A product according to claim 6 wherein said at least one graphics accelerator comprises four graphics accelerators for supporting four computer monitors, and in which the multiplexer is adapted to feed four television monitors.

10. A product according to claim 9 wherein said at least one video decoder comprises one video decoder for creating combined television programming.

11. A product according to claim 9 wherein said at least one video decoder comprises a plurality of video decoders, each adapted to create combined television programming.

12. A computer comprising a processor, mass memory capacity, input/out functionality, and circuitry for receiving at least one television programming input and displaying television programming corresponding thereto on multiple television monitors, said circuitry comprising:

a. at least one television programming input port for coupling at least one source of television programming to said circuitry;

b. at least one television tuner;

c. a video multiplexer coupled to the television tuner and adapted to be coupled to a plurality of television monitors, said video multiplexer coupled to a bus of the computer; said multiplexer also adapted to receive television programming and feed said programming to said television monitors, according to commands entered into said computer and sent to said multiplexer via said bus.

13. A computer according to claim 12 further comprising:

d. a video encoder for converting at least some of said television programming to digital format;

e. video monitor interface circuitry adapted to receive said television programming in digital format, adapted to be coupled to the bus of the computer and adapted to feed said television programming in digital format to at least one computer monitor, according to commands entered into said computer and sent to said interface circuitry via said bus.

14. A computer according to claim 13 further comprising:

f. a graphics accelerator adapted to receive signals from the computer corresponding to computer generated graphics and to receive television programming in digital format;

g. a video decoder adapted to receive signals from said graphics accelerator and based on them, prepare combined television programming corresponding to said computer generated graphics and television programming; and h. wherein said video multiplexer is adapted to receive said combined television programming for feeding to the multiple television monitors.

15. A computer comprising a processor, mass memory, input/output functionality and circuitry for receiving at least one television programming input and displaying television programming corresponding thereto on multiple television monitors, comprising:

a. at least one television programming input port for coupling at least one source of television programming to said circuitry;

b. a video multiplexer adapted to be coupled to a plurality of television monitors, said video multiplexer also adapted to be coupled to a bus of the computer; said multiplexer also adapted to receive television programming and feed said programming to said television monitors, according to commands entered into said computer and sent to said multiplexer via said bus;

c. a video encoder for converting said at least some of said television programming to digital format;

d. a graphics accelerator adapted to receive signals from the computer corresponding to computer generated graphics and to receive television programming in digital format;

e. a video decoder adapted to receive signals from said graphics accelerator and based on them, prepare combined television programming corresponding to said computer generated graphics and television programming; and f. wherein said video multiplexer is adapted to receive said combined television programming for feeding to the multiple television monitors.

16. A computer according to claim 15 further comprising video monitor interface circuitry adapted to receive said television programming in digital format, adapted to be coupled to the bus of the computer and adapted to feed said television programming in digital format to at least one computer monitor, according to commands entered into said computer and sent to said interface circuitry via said bus.

17. A computer comprising a processor, mass memory, input/output functionality and circuitry for receiving at least one television programming input and displaying television programming corresponding thereto on multiple television monitors, comprising:

a. at least one television programming input port for coupling at least one source of television programming to said circuitry;

b. a video multiplexer adapted to be coupled to a plurality of television monitors, said video multiplexer also adapted to be coupled to a bus of the computer; said multiplexer also adapted to receive television programming and feed said programming to said television monitors, according to commands entered into said computer and sent to said multiplexer via said bus;

c. at least one television tuner;

d. a plurality of video encoders for converting said at least some of said television programming to digital format;

e. a plurality of graphics accelerators adapted to receive signals from the computer corresponding to computer generated graphics and to receive television programming in digital format;

f. at least one video decoder adapted to receive signals from at least one of said graphics accelerators and based on them, prepare combined television programming corresponding to said computer generated graphics and television programming from said at least one accelerator; and g. wherein said video multiplexer is adapted to receive said combined television programming for feeding to the multiple television monitors.

18. A computer according to claim 17 further comprising a plurality of video monitor interface circuits, each adapted to receive said television programming in digital format from at least one accelerator, each adapted to be coupled to the bus of the computer and adapted to feed said television programming in digital format from said at least one accelerator to at least one computer monitor, according to commands entered into said computer and sent to said interface circuitry via said bus.

19. A computer according to claim 17 adapted to feed four television monitors.

20. A computer according to claim 18 adapted to feed four television monitors and a plurality of computer monitors.

21. A computer according to claim 17 in which said circuitry is adapted to receive a plurality of television programming inputs.

* * * * *